United States Patent
Hiraki

(10) Patent No.: US 9,323,060 B2
(45) Date of Patent: Apr. 26, 2016

(54) HEAD-MOUNTABLE DISPLAY

(71) Applicant: Nobuo Hiraki, Nagoya (JP)

(72) Inventor: Nobuo Hiraki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 257 days.

(21) Appl. No.: 14/188,115

(22) Filed: Feb. 24, 2014

(65) Prior Publication Data

US 2014/0168784 A1    Jun. 19, 2014

Related U.S. Application Data

(63) Continuation-in-part of application No. PCT/JP2012/071152, filed on Aug. 22, 2012.

(30) Foreign Application Priority Data

Aug. 23, 2011  (JP) ................................. 2011-181098

(51) Int. Cl.
*G02B 27/14* (2006.01)
*G02B 27/10* (2006.01)
*G02B 27/01* (2006.01)

(52) U.S. Cl.
CPC ........ *G02B 27/0176* (2013.01); *G02B 27/0172* (2013.01); *G02B 2027/0178* (2013.01)

(58) Field of Classification Search
USPC ................................................ 359/619–630
See application file for complete search history.

(56) References Cited

U.S. PATENT DOCUMENTS

| 2002/0149545 | A1 | 10/2002 | Hanayama et al. | |
| 2006/0119539 | A1 | 6/2006 | Kato et al. | |
| 2009/0243970 | A1 | 10/2009 | Kato et al. | |
| 2012/0044571 | A1* | 2/2012 | Mukawa | 359/630 |
| 2012/0188149 | A1 | 7/2012 | Yamada | |
| 2014/0168784 | A1* | 6/2014 | Hiraki | 359/630 |

FOREIGN PATENT DOCUMENTS

| JP | 2004-233948 A | 8/2004 |
| JP | 2007-178941 A | 7/2007 |

(Continued)

OTHER PUBLICATIONS

International Search Report received in corresponding International Application No. PCT/JP2012/071152 mailed Nov. 20, 2012.

(Continued)

*Primary Examiner* — Joseph P Martinez
*Assistant Examiner* — Brandi Thomas
(74) *Attorney, Agent, or Firm* — Banner & Witcoff, Ltd.

(57) ABSTRACT

A display unit in a head mounted display (HMD) is divided into a main body part generating image light; and an emission port part having an emission port through which the generated image light is emitted to the observer's eye. The main body part and the emission port part are connected to each other such that they are allowed to be attached and detached by an external force. In a head mounting state of the HMD, when a first external force acts on the emission port part in response to a situation that the emission port part (e.g., a half mirror) comes into contact with a member located at or near the observing eye or in front of the observing eye within the observer's face and thereby protecting the observing eye, the first external force causes the emission port part to be detached from the main body part.

16 Claims, 16 Drawing Sheets

(56) References Cited

FOREIGN PATENT DOCUMENTS

| JP | 2010-087560 A | 4/2010 |
| JP | 2010-141453 A | 6/2010 |
| JP | 2010-175829 A | 8/2010 |
| JP | 4573488 B2 | 11/2010 |
| JP | 2011-075956 A | 4/2011 |
| WO | 2011/040314 A1 | 4/2011 |

OTHER PUBLICATIONS

Sep. 15, 2015—(JP) Notification of Reason for Refusal—App 2014-161078, Eng Tran.

* cited by examiner (c)

F I G. 1 4
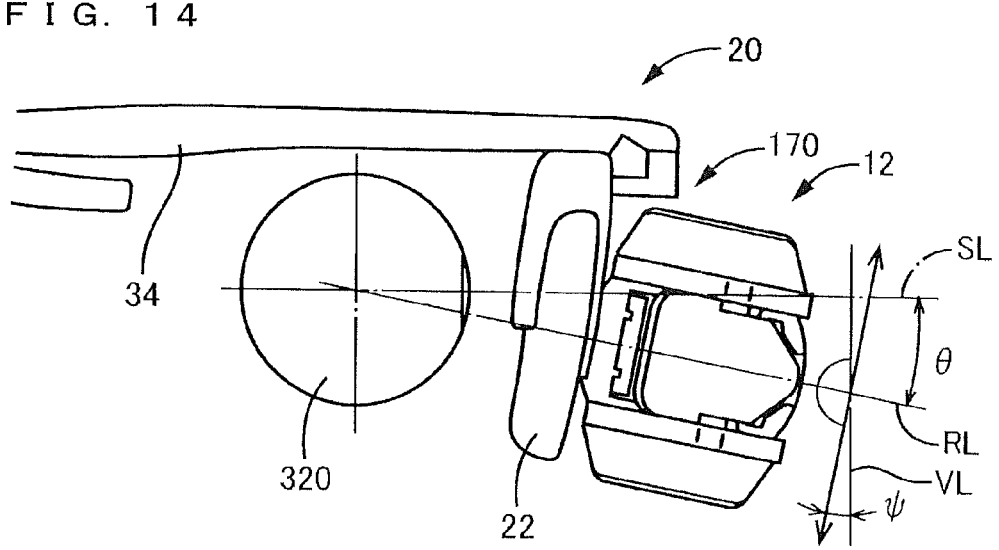

HEAD-MOUNTABLE DISPLAY

This application is a continuation-in-part of PCT International Application No. PCT/JP2012/071152 which has an International filing date of Aug. 22, 2012, which designated the United States of America.

TECHNICAL FIELD

The present disclosure relates to a head mountable display (abbreviated as an "HMD", hereinafter) displaying an image to an observer in a head mounting state of being mounted on the head of an observer. In particular, the present disclosure relates to a technique of improving the safety of the HMD for the user during the use.

BACKGROUND

An HMD is already known which is mounted on the head of an observer in order to project, onto the observer's eye, image light representing an image to be displayed. According to the HMD, the observer is allowed to directly observe the image without the intermediation of a screen onto which the image is projected.

In general, an HMD includes a display unit and an attachment. The display unit projects image light corresponding to an image signal onto the observer's eye and thereby displays the image to the observer. The attachment is configured to attach the display unit to a mounted member to be mounted on the head of the observer. For example, employable attachments include a frame of eye glasses, a dedicated frame of eye glasses type, a helmet, a band, goggles, and a frame to be mounted on the head of an observer by using one ear. An example of detailed form of the display unit is a single-eye display unit projecting image light onto the observing eye which is one of the observer's both eyes and thereby displaying the image to the observer.

In the prior art, there is an HMD of see-through type provided with a single-eye-type display unit. The display unit includes a half mirror arranged in front of the observer's eye. Further, Patent Document 1 discloses a technique that a protection member extending from the tip part of the half mirror toward the left and right directions relative to the observer is attached to the tip part of the half mirror and that the observer-side surface of the protection member is flattened. According to this technique, even when the tip part of the half mirror gets close to the observing eye, the protection member having a more flat shape approaches the observing eye before the tip part does. This improves the safety of the HMD for the observer's eye during the use.

SUMMARY

The present inventor has researched on the safety of the HMD for the user and thereby found that even a technique different from the conventional technique is allowed to improve the safety of the HMD for the user during the use.

On the basis of such findings, the present disclosure has been achieved in order to propose a new technique of improving the safety of the HMD for the user during the use.

An aspect of the present disclosure is a head mountable display comprising: a display unit configured to project image light corresponding to an image signal onto an observing eye which is one of both eyes of an observer; and an attachment configured to attach the display unit to a mounted member to be mounted on a head of the observer, wherein the display unit includes: a main body part accommodating an image light generator configured to generate the image light; an emission part configured to deflect and emit the image light from the image light generator toward the observing eye by a deflection member; and a connection mechanism detachably connecting the main body part and the emission part, wherein the main body part and the emission part are arranged in a first direction, the first direction being a direction intersecting frontward and rearward directions relative to the observer in front of the observer's face when the display unit is mounted on the head of the observer through the attachment, wherein the attachment is configured to hold the display unit to provide the emission part in front of the observing eye when the display unit is mounted on the head of the observer, and wherein the connection mechanism is configured such that the emission part is detached from the main body part when the display unit is mounted on the head of the observer through the attachment and when the emission part comes into contact with a member located in front of the observing eye and thereby protecting the observing eye so that a first external force acts on the emission part.

Effect of Invention

According to the present disclosure, the display unit is divided into: a main body part generating image light; and an emission port part having an emission port through which the generated image light is emitted to the observer's eye. Then, the main body part and the emission port part are detachably connected to each other by an external force. In a head mounting state of the HMD, when a first external force acts on the emission port part in response to coming into contact with a member (generically referred to as a "protection member", hereinafter) located in front of the observing eye and thereby protecting the observing eye, the first external force causes the emission port part to be detached from the main body part.

Thus, according to the present disclosure, even when the emission port part of the display unit comes into contact with the protection member, the contact causes the emission port part to be detached from the main body part and hence the contact between the emission port part and the protection member does not continue. Accordingly, according to the present disclosure, by virtue of a technique that when a part of the display unit comes into contact with the protection member, that part is detached from the other portion, safety of the HMD against contact with the user during the use is improved.

BRIEF DESCRIPTION OF DRAWINGS

FIG. 14 is a side view illustrating a construction that an up-and-down position adjustment mechanism illustrated in FIG. 1 adjusts the position of the display unit in a direction inclined relative to a vertical line.

MODE OF IMPLEMENTING INVENTION

As an example, one of further detailed embodiments of the present disclosure is described below in detail with reference to the drawings.

Figure 1:
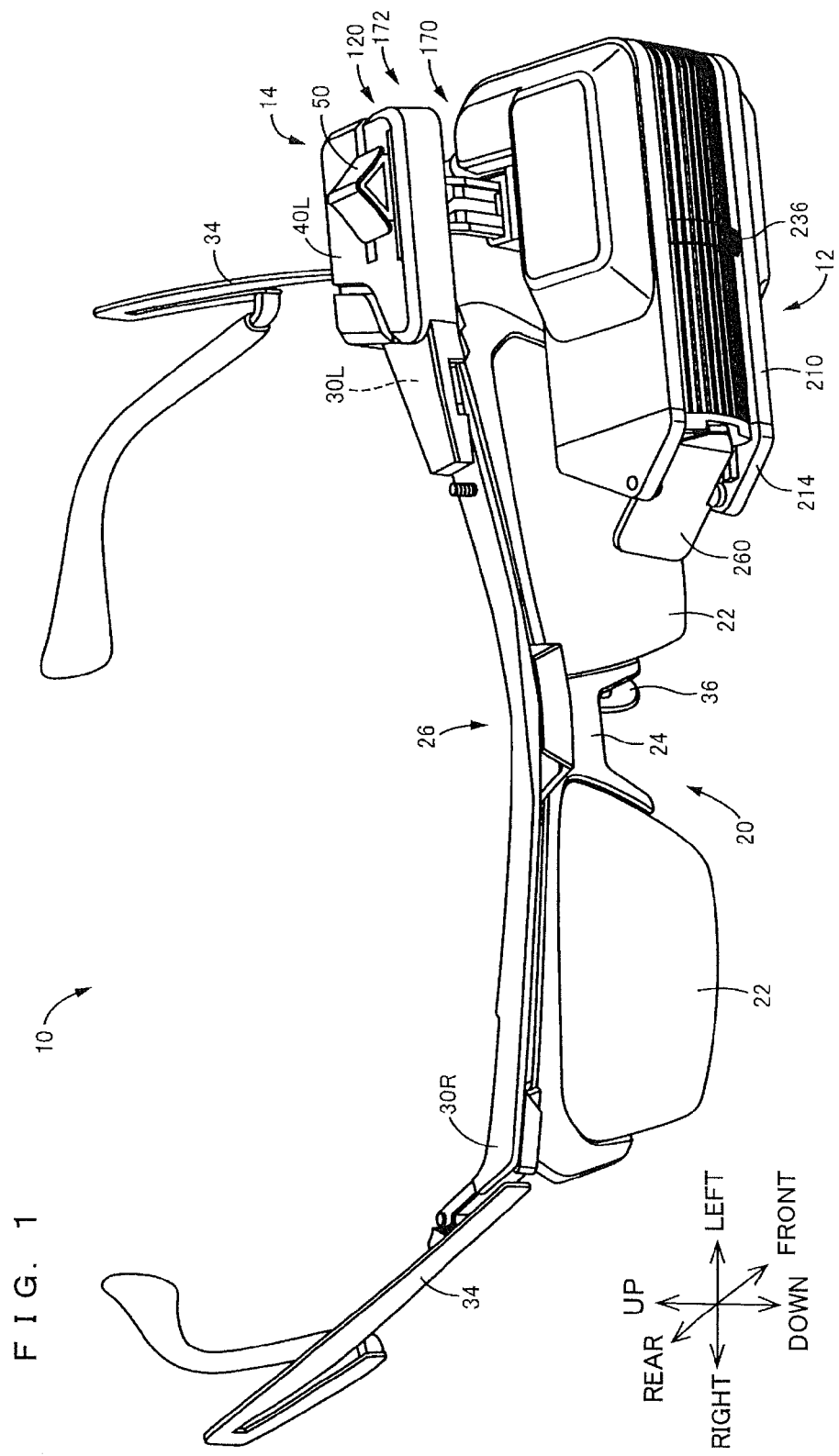
FIG. 1 is a perspective view illustrating a head mountable display (HMD) in a left-eye observation mode together with a frame used for mounting onto the head of an observer.

In FIG. 1, a head mountable display (abbreviated as an "HMD", hereinafter) 10 according to an embodiment of the present disclosure is illustrated in a perspective view. The HMD 10 comprises a display unit 12 of see-through type and an attachment 14.

The display unit 12 is of single-eye type and hence configured to project image light representing an image onto an observing eye which is one of the observer's both eyes (the other eye is a non-observing eye). The display unit 12 has a shape extending in a longitudinal direction serving as an example of a first direction. Further, in a state of being mounted on the head of an observer (referred to as a "head mounting state", hereinafter), the display unit 12 is arranged in front of the observing eye such as to extend in a direction intersecting the frontward and rearward directions relative to the observer (approximately in the left and right directions in the present embodiment).

As an observation type for the display image, the display unit 12 is of a see-through type, that is, a type in which the observer is allowed to observe the actual external world in a state of being overlaid on the display image by the display unit 12. However, in place of the see-through type, the display unit 12 may be of a completely or partially closed type, that is, a type in which incident light from the actual external world is cut off completely or partly so that the observer is allowed to almost actively observe the display image.

A frame 20 serving as a mounted member is mounted on the head of the observer. Then, as illustrated in FIG. 1, the attachment 14 is mounted on the frame 20 and then the display unit 12 is mounted on the attachment 14. As a result, the display unit 12 is mounted on the frame 20 through the attachment 14.

Although not illustrated, the frame 20 is mounted on the head of the observer in a state of being held by the observer's both ears. In the present embodiment, the frame 20 serves as a dedicated frame used for observing the display image of the HMD 10. However, ordinary eye glasses worn by the observer for the purpose of vision correction or eyeball protection (e.g., eye glasses for near-sightedness or far-sightedness, sunglasses, and protective goggles for working) may be employed in place of the frame 20. Further, in the present embodiment, the frame 20 of eye glasses type is employed as an example of the mounted member. Instead, a mounted member of any other form such as a helmet, a band, and goggles to be mounted on the head of the observer may be employed.

The frame 20 may be referred to as an eye-glasses type frame from the perspective of the fact that the basic shape thereof resembles the shape of ordinary eye glasses. For the purpose of physically protecting the observer's both eyes from the HMD 10, the frame 20 includes a pair of lens-shaped transparent bodies 22 and 22 (e.g., dummy lenses imitating the lenses of eye glasses and substantially not performing light refraction) located in front of the observer's both eyes in the head mounting state.

The pair of lens-shaped transparent bodies 22 and 22 are connected to each other by a bridge 24. Then, the pair of lens-shaped transparent bodies 22 and 22 and the bridge 24 constitute a front part 26 in the frames 20. A pair of temples 34 and 34 extend respectively from the left side part 30L and the right side part 30R of the front part 26. The frame 20 is held by the observer's both ears by virtue of the pair of temples 34 and 34.

The front part 26 further includes a pair of pads 36 and 36 in contact with the observer's nose from both sides in the head mounting state. When the pair of pads 36 and 36 are in contact with the observer's nose, the position (in the frontward and rearward directions, the left and right directions, and the up and down directions viewed from the observer) of the frame 20 relative to the observer's nose, that is, to both eyes, is determined to be identical.

Next, the attachment 14 is described. In accordance with observer's selection, the attachment 14 is switched between a state that the display unit 12 is attached to the right side part 30R of the frame 20 for the purpose of implementing a right-eye observation mode that the observer's right eye serves as the observing eye and a state that the display unit 12 is attached to the left side part 30L of the frame 20 for the purpose of implementing a left-eye observation mode that the observer's left eye serves as the observing eye.

Figure 2A:
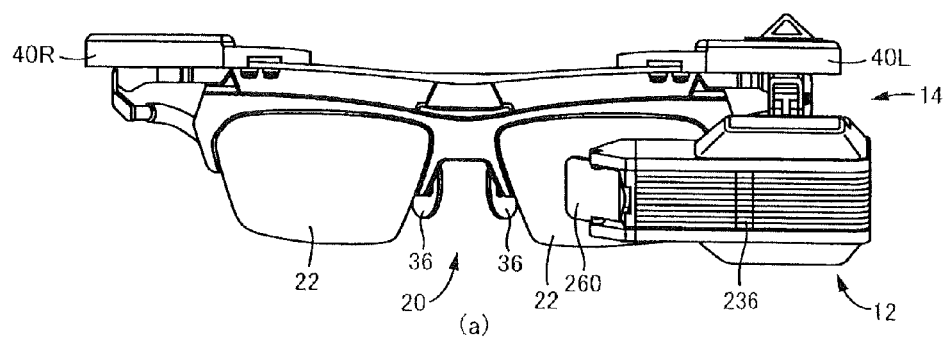
FIG. 2A is a front view illustrating the HMD illustrated in FIG. 1 in the left-eye observation mode.

In FIGS. 1 and 2A, the HMD 10 is illustrated in a state of being used in the left-eye observation mode. In contrast, in FIG. 2B, the HMD 10 is illustrated in a state of being used in the right-eye observation mode. The attachment 14 allows the display unit 12 to be attached to the right side part 30R or the left side part 30L of the frame 20 for use.

Figure 2B:
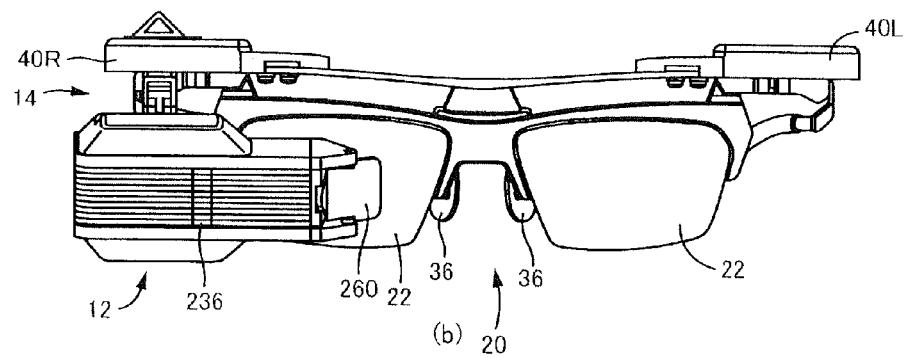
FIG. 2B is a front view illustrating the HMD in the right-eye observation mode.

As illustrated in FIGS. 2A and 2B, the display unit 12 is used in a manner that the orientation thereof is reversed between the right-eye observation mode and the left-eye observation mode. Specifically, the orientation that the display unit 12 is mounted on the frame 20 through the attachment 14 is reversed between the right-eye observation mode and the left-eye observation mode, within a vertical plane approximately parallel to the observer's left and right directions in the head mounting state.

As illustrated in FIGS. 2A and 2B, the attachment 14 includes: a left-eye frame side member 40L fixed to the left side part 30L of the frame 20; and a right-eye frame side member 40R fixed to the right side part 30R of the frame 20. The left-eye frame side member 40L and the right-eye frame side member 40R form a planar shape extending approximately in the left and right directions in the head mounting state. Further, the left-eye frame side member 40L and the right-eye frame side member 40R have a structure of being symmetric to each other with respect to a center line of the frontward and rearward directions of the frame 20 in the head mounting state.

As illustrated in FIGS. 3, 4C, 4D, and 4E, the attachment 14 further includes an intermediate member 50 common to the right-eye frame side member 40R and the left-eye frame side member 40L. As illustrated in FIGS. 2A and 2B, the intermediate member 50 is attached to the right-eye frame side member 40R or the left-eye frame side member 40L for use.

Figure 3:
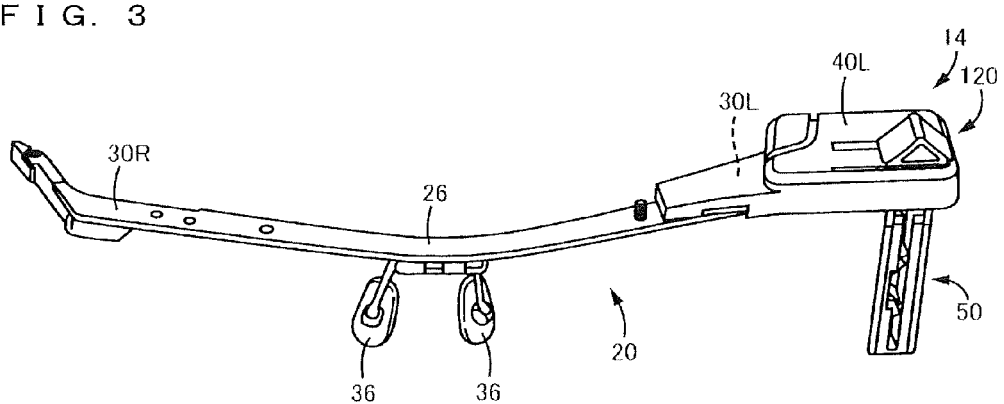
FIG. 3 is a perspective view illustrating the HMD illustrated in FIG. 1 in a state that a display unit has been detached and in the left-eye observation mode.
Figure 4A:
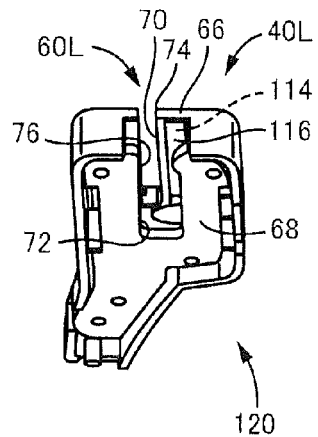
FIG. 4A is a perspective view illustrating a frame side member illustrated in FIG. 3.

As illustrated in FIG. 4A, the left-eye frame side member 40L includes an engagement part 60L. Then, as illustrated in FIG. 3, the engagement part 60L is mounted on the intermediate member 50 detachably and slidably. Although not illustrated, similarly, the right-eye frame side member 40R includes an engagement part 60R similar to the engagement part 60L. Then, the engagement part 60R is mounted on the intermediate member 50 detachably and slidably.

Specifically, as illustrated in FIG. 4A, the left-eye frame side member 40L includes an upper plate 66 and a lower plate 68 parallel to each other. In the upper plate 66, an upper slot 70 is opened. Further, in the lower one, a lower slot 72 having a larger width than the upper slot 70 is opened and located in the same vertical plane as the upper slot 70. The upper slot 70 and the lower slot 72 have opening parts 74 and 76 in the end portions on the same side. Through the opening parts 74 and 76, the intermediate member 50 is inserted into the left-eye frame side member 40L and the intermediate member 50 is detached from the left-eye frame side member 40L.

Figure 4B:
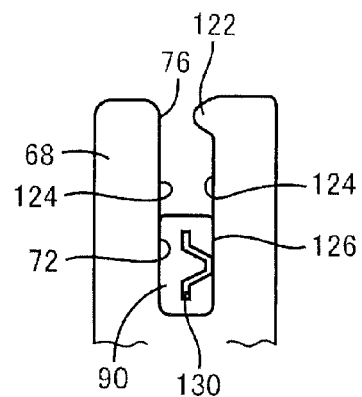
FIG. 4B is a bottom view illustrating a part of a lower plate of the frame side member illustrated in FIG. 4A.

The upper plate 66 and the lower plate 68 as well as the upper slot 70 and the lower slot 72 constitute the engagement part 60L of the left-eye frame side member 40L. Although not illustrated, similarly, the engagement part 60R of the right-eye frame side member 40R includes an upper plate 66 and a lower plate 68 as well as an upper slot 70 and a lower slot 72. Then, these components constitute the engagement part 60R of the right-eye frame side member 40R. In FIG. 4B, the lower slot 72 of the left-eye frame side member 40L are illustrated in an enlarged manner in bottom view.

Figure 4C:
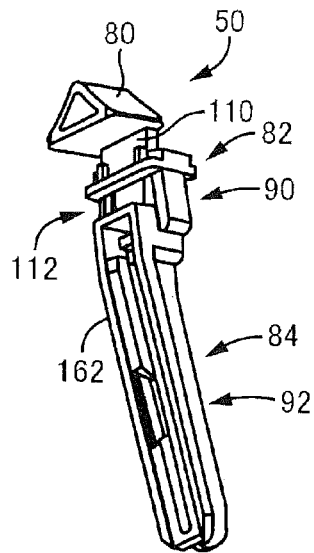
FIG. 4C is a perspective view illustrating an intermediate member illustrated in FIG. 3.
Figure 4D:
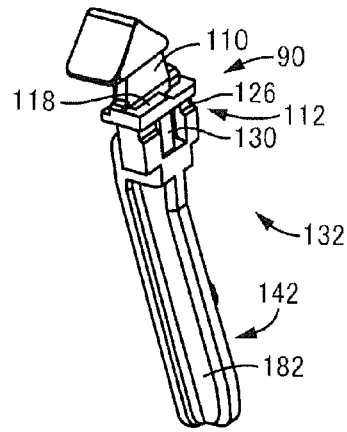
FIG. 4D is a perspective view illustrating the intermediate member at an angle different from that in FIG. 4C.
Figure 4E:
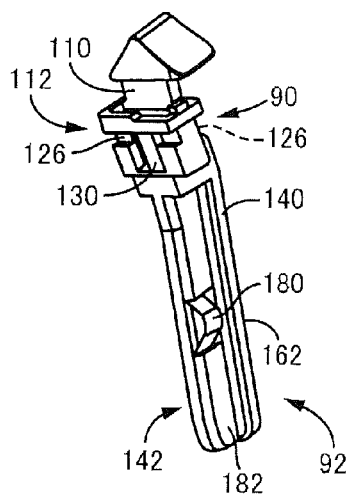
FIG. 4E is a perspective view illustrating the intermediate member at an angle different from those in FIGS. 4C and 4D.

As illustrated in FIGS. 4C, 4D, and 4E, the intermediate member 50 has an approximate rod shape. The intermediate member 50 is mounted on the engagement part 60 (60L or 60R) of the selected frame side member 40 (40L or 40R) selected by the observer from among the right-eye frame side member 40R and the left-eye frame side member 40L, detachably and slidably approximately in the left and right directions relative to the observer in the head mounting state.

Specifically, as illustrated in FIGS. 4C, 4D, and 4E, the intermediate member 50 includes a head 80, a neck 82, and a shank 84. The head 80, the neck 82, and the shank 84 are aligned in this order approximately in the axial direction of the intermediate member 50. In the present embodiment, the shank 84 extends linearly in the longitudinal direction thereof but is bent rearward relative to the head 80 and the neck 82 aligned linearly with each other in side view in the head mounting state. The reason for this is described later.

Figure 5A:
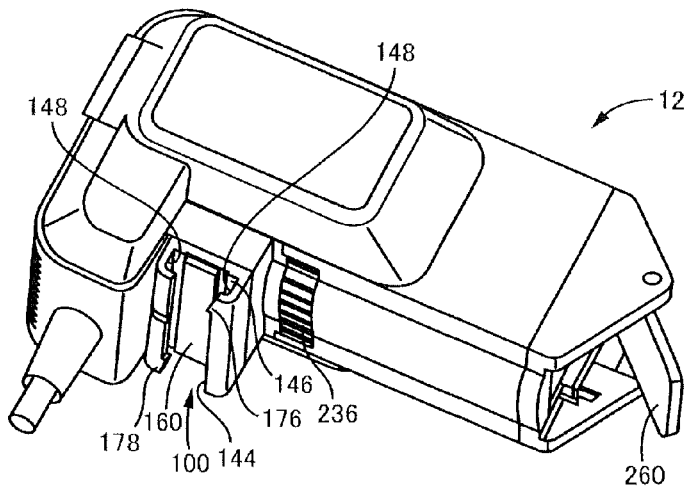
FIG. 5A is a perspective view illustrating a rear part of the display unit illustrated in FIG. 1.
Figure 5B:
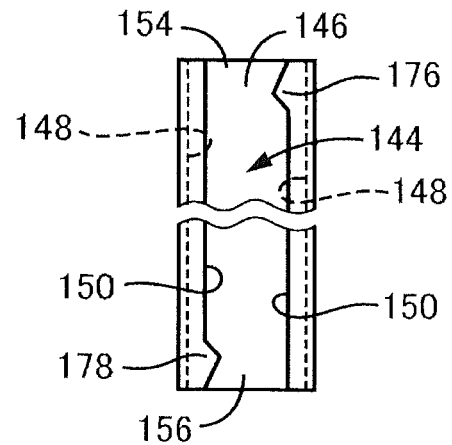
FIG. 5B is an enlarged front view illustrating an engagement part of the display unit.

In the neck 82, a first engagement part 90 is formed such as to extend in the transverse direction of the intermediate member 50. In the shank 84, a second engagement part 92 is formed such as to extend in the longitudinal direction of the intermediate member 50. As illustrated in FIG. 3, the first engagement part 90 is a portion engaging with the engagement part 60 of the selected frame side member 40 detachably and slidably. On the other hand, as illustrated in FIGS. 5A and 5B, the second engagement part 92 is a portion engaging with the engagement part 100 of the display unit 12 detachably and slidably.

As illustrated in FIG. 3, in a state that the first engagement part 90 of the intermediate member 50 engages with the engagement part 60L of the left-eye frame side member 40L, the head 80 of the intermediate member 50 is exposed from the upper face of the left-eye frame side member 40L. The exposed head 80 is moved in the left and right directions relative to the observer by a finger of the user who is the observer. For example, the cross sectional shape of the head 80 may be a triangular cross section, a rectangular cross section, a convex cross section like a semicircular cross section, or a concave cross section.

Further specifically, as illustrated in FIGS. 4C, 4D, and 4E, the first engagement part 90 of the intermediate member 50 includes: an upper slide part 110 which is slidably fit into the upper slot 70 of the engagement part 60 of the selected frame side member 40; and a lower slide part 112 which is slidably fit into the lower slot 72 of the engagement part 60 of the selected frame side member 40.

As illustrated in FIG. 4A, a first elastic member 116 having a thin plate shape (typically, a member such as a urethane pad and a rubber pad having a flat shape; however, this may be replaced by a member such as a flat spring having a curved surface) is mounted on the downward face 114 of the upper plate 66 of the selected frame side member 40 such as to extend along the upper slot 70. In a state that the intermediate member 50 is mounted on the selected frame side member 40, the exposed surface of the first elastic member 116 is slidably in contact with the slide surface (upward face) 118 of the first engagement part 90. This generates a frictional force between the intermediate member 50 and the selected frame side member 40 approximately in the left and right directions.

During the movement that the intermediate member 50 is slid in one direction relative to the selected frame side member 40, that frictional force acts as a first resistance force against the movement. As a result, the intermediate member 50 is allowed to stop relative to the selected frame side member 40 at an arbitrary position approximately in the left and right directions relative to the observer. When the user imparts to the intermediate member 50 an operation force of a magnitude overcoming the first resistance force, the intermediate member 50 is moved relative to the selected frame side member 40 in a direction selected from the approximate left and right directions.

That is, the engagement part 60 of the selected frame side member 40 and the first engagement part 90 of the intermediate member 50 cooperate with each other so as to constitute a left-and-right position adjustment mechanism 120 configured to adjust the relative position of the display unit 12 relative to the observing eye of the observer in the position adjustment direction which is approximately left and right directions in accordance with operation by the observer.

As illustrated in FIG. 4B, the lower slot 72 of the selected frame side member 40 includes a raised portion 122 in the opening part 76 thereof. The lower slot 72 includes a pair of side wall surfaces 124 and 124 extending in the frontward and rearward directions. The width directions of the pair of side wall surfaces 124 and 124 agree with the up and down directions. The raised portion 122 is formed on one of the pair of side wall surfaces 124 and 124 as an obstacle projecting from the side wall surface 124 at right angle. The first engagement part 90 includes a pair of slide surfaces 126 and 126 slidably in contact with the pair of side wall surfaces 124 and 124 in a state that the intermediate member 50 is mounted on the selected frame side member 40.

As illustrated in FIG. 4E, the first engagement part 90 of the intermediate member 50 includes a second elastic member 130 in order to prevent the intermediate member 50 from being unintentionally detached from the selected frame side member 40. As illustrated in FIGS. 4B and 4E, the second elastic member 130 is exposed in a state of protruding, in a direction perpendicular to the slide surface 126, from one of the pair of slide surfaces 126 and 126 of the first engagement part 90 which is in contact with the side wall surface 124 of the selected frame side member 40 provided with the raised portion 122 in a state of engagement with the selected frame side member 40.

As illustrated in FIG. 4B, in the present embodiment, the second elastic member 130 is a flat spring having a wave shape. Instead, a spring having any other shape may be employed. FIG. 4E illustrates a situation that in the wave-shaped flat spring, one peak part thereof is exposed from the slide surface 126. The flat spring has a shape and arrangement similar to those of the wave-shaped flat spring serving as a fourth elastic member described later.

In a state that the intermediate member 50 is mounted on the selected frame side member 40, two possibilities are present that the second elastic member 130 is elastically pressed against one slide surface 126 and that the second elastic member 130 is not pressed. Immediately before the intermediate member 50 is slid relative to the engagement part 60 of the selected frame side member 40 so as to be detached from the engagement part 60, the second elastic member 130 is pressed against the raised portion 122. As a result, a second resistance force against the sliding movement of the intermediate member 50 is generated.

The second resistance force is generated as a force greater than the first resistance force. When the user adjusts the left and right position without intending detachment of the intermediate member 50, the raised portion 122 is not allowed to climb over the second elastic member 130 as long as no operation force greater than the second resistance force is imparted to the intermediate member 50. This avoids detachment of the intermediate member 50 and falling of the display unit 12 not intended by the user. That is, the raised portion 122 and the second elastic member 130 constitute a left and right directional detachment prevention mechanism 132 configured to prevent the intermediate member 50 from being slid to right or left relative to the selected frame side member 40 in contrast to the user's intention so as to be detached from the selected frame side member 40.

As illustrated in FIGS. 4C, 4D, and 4E, the second engagement part 92 of the intermediate member 50 has a shape extending linearly with a cross section of approximate T-shape. Specifically, the second engagement part 92 includes: a bottom part 140 having a plate shape extending linearly and corresponding to the horizontal stroke of the T-shape; and a vertical wall part 142 formed integrally on one face of the bottom part 140 and corresponding to the vertical stroke of the T-shape. The vertical wall part 142 extends along a vertical plane extending in the longitudinal direction of the bottom part 140 and then bisecting the bottom part 140.

In contrast, as illustrated in FIG. 5A, the engagement part 100 of the display unit 12 is formed integrally such as to extend in the up and down directions on the surface constituting, in the head mounting state, the rear face among a plurality of surfaces constituting the outer surfaces of the display unit 12. The engagement part 100 includes an engagement groove 144 extending linearly with a cross section of approximate T-shape. The engagement groove 144 includes: a bottom face 146; a pair of wide side walls 148 and 148 defining in the longitudinal direction an inner space corresponding to the horizontal stroke of the T-shape; and a pair of narrow side walls 150 and 150 defining in the longitudinal direction an inner space corresponding to the vertical stroke of the T-shape. In FIG. 5B, the pair of narrow side walls 150 and 150 are illustrated in an enlarged manner in front view. The second engagement part 92 of the intermediate member 50 is slidably fit into the engagement groove 144 of such shape.

The engagement groove 144 is opened at both ends 154 and 156 thereof. Through one of the both ends 154 and 156 of the engagement groove 144, the intermediate member 50 is inserted into the engagement groove 144 for the purpose of shift to the left-eye observation mode. Further, through the other end 154 or 156, the intermediate member 50 is inserted into the engagement groove 144 for the purpose of shift to the right-eye observation mode.

As illustrated in FIG. 5A, a third elastic member 160 having a thin plate shape is mounted on the bottom face 146 of the engagement groove 144 in a manner of extending along the engagement groove 144. The third elastic member 160 is formed from a member such as a urethane pad and a rubber pad having a flat shape. However, the third elastic member 160 may be formed from a member such as a flat spring having a curved surface. In a state that the display unit 12 is mounted on the intermediate member 50, the exposed surface of the third elastic member 160 is slidably in contact with a tip surface (a rearward face) 162 of the bottom part 140 of the second engagement part 92. This contact generates a frictional force between the intermediate member 50 and the display unit 12 approximately in the up and down directions.

During the movement that the intermediate member 50 is slid in one direction relative to the display unit 12, that frictional force acts as a third resistance force against the movement. As a result, the intermediate member 50 is allowed to stop relative to the display unit 12 at an arbitrary position approximately in the up and down directions relative to the observer. When the user imparts to the intermediate member 50 an operation force of a magnitude overcoming the third resistance force, the intermediate member 50 is moved relative to the display unit 12 in a direction selected from the approximate up and down directions.

That is, the second engagement part 92 of the intermediate member 50 and the engagement part 100 of the display unit 12 cooperate with each other so as to constitute an up-and-down position adjustment mechanism 170 configured to adjust the relative position of the display unit 12 relative to the observing eye of the observer in accordance with operation by the observer in the position adjustment direction which is the approximate up and down directions.

In the present embodiment, the left-and-right position adjustment mechanism 120 and the up-and-down position adjustment mechanism 170 are provided as adjustment mechanisms configured to adjust at least one of the relative position and the angle of the display unit 12 relative to the frame 20. The left-and-right position adjustment mechanism 120 and the up-and-down position adjustment mechanism 170 cooperate with each other so as to constitute a position adjustment mechanism 172.

As illustrated in FIG. 5B, in one of the pair of narrow side walls 150 and 150 illustrated on the right side in the figure, a projection 176 is formed at one of both ends 154 and 156 of the engagement groove 144 located on the upper side in the left-eye observation mode. Further, in one of the pair of narrow side walls 150 and 150 illustrated on the left side in the figure, a projection 178 is formed at one of both ends 154 and 156 of the engagement groove 144 located on the upper side in the right-eye observation mode. The former projection 176 is provided for the purpose of avoiding a situation (preventing the falling) that in the left-eye observation mode, the display unit 12 is slid downward relative to the intermediate member 50 in contrast to the observer's intention so as to be detached from the intermediate member 50. On the other hand, the latter projection 178 is provided for the purpose of prevention of falling of the display unit 12 in the right-eye observation mode.

Figure 5C:
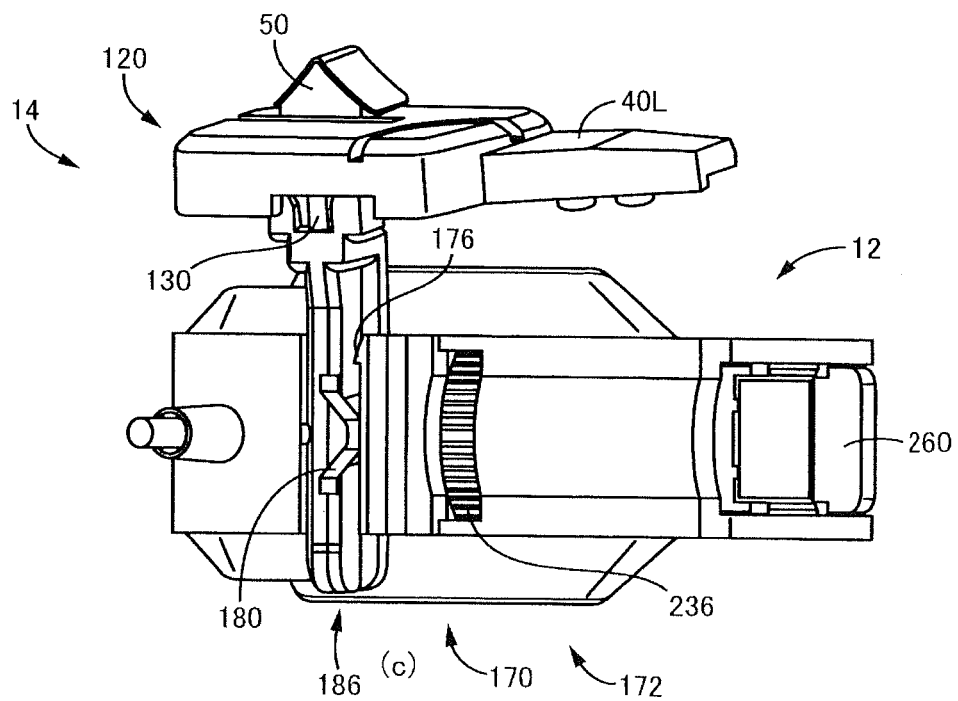
FIG. 5C is a perspective view illustrating the rear part of the HMD illustrated in FIG. 1 in an assembled state.

As illustrated in FIGS. 4E and 5C, the second engagement part 92 includes a fourth elastic member 180 for the purpose of preventing the intermediate member 50 from being unintentionally detached from the display unit 12. The fourth elastic member 180 is mounted on the second engagement part 92 such as to be exposed from that located on right-hand side in the left-eye observation mode among both side surfaces 182 and 182 of the vertical wall part 142 of the second engagement part 92 and then protrude from the side surface 182 at right angle. In the present embodiment, as illustrated in FIG. 5C, the fourth elastic member 180 is a flat spring having a wave shape. Instead, a spring having any other shape may be employed.

In a state that the intermediate member 50 is mounted on the display unit 12, the fourth elastic member 180 is elastically pressed against one of the wide side walls 148 and 148 or alternatively not pressed. However, before the display unit 12 is slid downward relative to the intermediate member 50 and then detached from the intermediate member 50, the fourth elastic member 180 is pressed against the projection 176 or 178. As a result, a fourth resistance force against the sliding movement of the display unit 12 is generated.

The fourth resistance force is generated as a force greater than the third resistance force. When the user adjusts the up and down position without intending detachment of the intermediate member 50, the projection 176 or 178 is not allowed to climb over the fourth elastic member 180 as long as no operation force greater than the third resistance force is imparted to the intermediate member 50. This avoids falling of the display unit 12 in contrast to the user's intention. In this case, the intermediate member 50 remains in the selected frame side member 40.

That is, the projection 176 or 178 and the fourth elastic member 180 constitute a downward detachment prevention mechanism 186 configured to prevent the display unit 12 from being slid downward relative to the intermediate member 50 in contrast to the user's intention so as to be detached from the intermediate member 50.

The attachment 14 of the HMD 10 has been described above. Next, the display unit 12 is described below.

As illustrated in FIG. 1, the display unit 12 includes a housing 200 which extends in the longitudinal direction thereof and is almost hollow. The housing 200 is fabricated from synthetic resin. The housing 200 accommodates an image light generator 202 (see FIG. 6) configured to generate image light. The display unit 12 includes: a main body part 210 accommodating the image light generator 202; and an emission port part 214 (emission part) provided with an emission port 212 through which image light generated by the image light generator 202 is emitted toward the observing eye. The main body part 210 and the emission port part 214 are aligned in the longitudinal direction.

In the head mounting state, the main body part 210 has a horizontally elongated cross section extending in the frontward and rearward directions relative to the observer. Similarly, in the head mounting state, the emission port part 214 has a horizontally elongated cross section extending in the frontward and rearward directions relative to the observer. The shape of the horizontally elongated cross section reflects the horizontally elongated rectangular shape of the image display area where the observer perceives the image displayed by the display unit 12. Further, the vertical dimension of the horizontally elongated cross section of the emission port part 214 is set to be smaller than the vertical dimension of the horizontally elongated cross section of the main body part 210.

Figure 6:
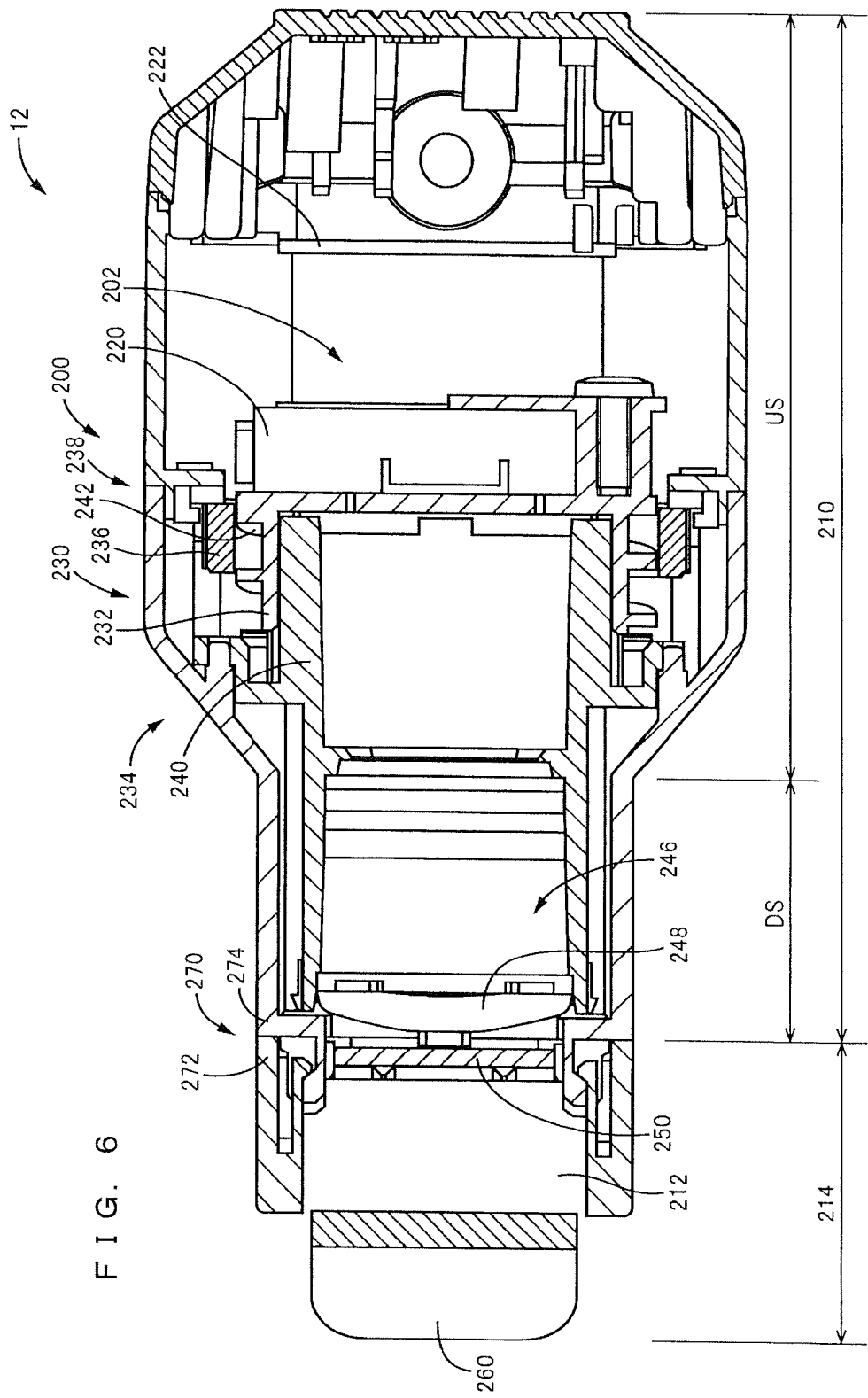
FIG. 6 is the vertical sectional view illustrating a display unit illustrated in FIG. 1.

As illustrated in FIG. 6, the image light generator 202 includes an LCD 220 serving as a spatial light modulation element having an approximate plate shape and two-dimensionally modulating incident light so as to generate the image light. The LCD 220 is a liquid crystal display in which a plurality of pixels are aligned in two dimensions.

Here, in the present embodiment, the display unit 12 is of a spatial light modulation type. However, the display unit 12 may be changed into a unit of retina scanning type, that is, a unit in which a light beam from a light source such as a laser is scanned by a scanner and then the scanned light beam is projected on the observer's retina.

The image light generator 202 further includes a drive circuit 222 having a plate shape. The drive circuit 222 is electrically connected to the LCD 220 through a cable (not illustrated). The drive circuit 222 drives the LCD 220 on the basis of the image signal inputted from the outside so that image light representing the image to be displayed on the observer is emitted from the LCD 220. The LCD 220 includes a back light source therein. However, in place of this light source, a light source separated from the LCD 220 may be employed. The drive circuit 222 and the LCD 220 (as well as a focus adjustment mechanism 230 described later) is accommodated in a portion of the housing 200 belonging to the main body part 210.

The LCD 220 includes an image display surface of rectangular shape having a pair of long sides facing with each other and a pair of shorter sides facing with each other. Then, the LCD 220 is arranged in the image light generator 202 such that in the head mounting state, the pair of long sides of the image display surface extend in the frontward and rearward directions.

As illustrated in FIG. 6, the image light generator 202 further includes a focus adjustment mechanism 230 configured to displace the LCD 220 frontward and rearward in the optical axis direction and thereby adjust the focus position of the image light. The focus adjustment mechanism 230 includes an LCD holder 232, a support mechanism 234, an LCD adjuster 236 (an operation part), and a motion conversion mechanism 238. Similarly to the LCD 220, the focus adjustment mechanism 230 is accommodated in a portion of the housing 200 belonging to the main body part 210.

The LCD 220 has an optical axis direction agreeing with the longitudinal direction of the image light generator 202 and is supported in the housing 200 in a manner permitting displacement in the optical axis direction. Specifically, the LCD 220 is held by the LCD holder 232 integrally in a revolvable and movable manner. Then, the LCD holder 232 is supported in a manner of being movable in the optical axis direction and being non-revolvable by the support mechanism 234 provided in a part of the housing 200 or in another member (a static member 240 in the present embodiment) fixed to the housing 200.

As illustrated in FIG. 6, the LCD adjuster 236 is installed in the housing 200 coaxially to the optical axis such as to enclose the outer periphery part of the LCD holder 232. The LCD adjuster 236 is supported by the housing 200 in a manner of being unmovable in the optical axis direction and being coaxially revolvable. Thus, at a fixed position in the optical axis direction, the LCD adjuster 236 is revolved by a required angle in accordance with operation by the user. For the purpose of permitting access to the LCD adjuster 236 by the user, as illustrated in FIGS. 1 and 5C, a portion of the LCD adjuster 236 located frontward in the head mounting state and a portion located rearward in the head mounting state are exposed respectively from the front face and the rear face among the plurality of surfaces constituting the housing 200. In the outer peripheral surface of the LCD adjuster 236, a plurality of teeth are formed in order to improve operability for the user.

Figure 7A:
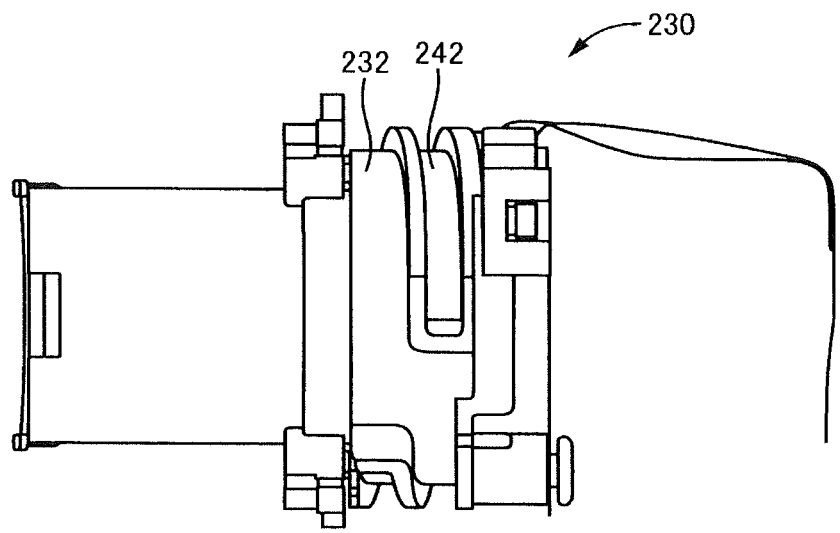
FIG. 7A is a side view illustrating a focus adjustment mechanism illustrated in FIG. 6 in a state that an LCD adjuster has been detached.
Figure 7B:
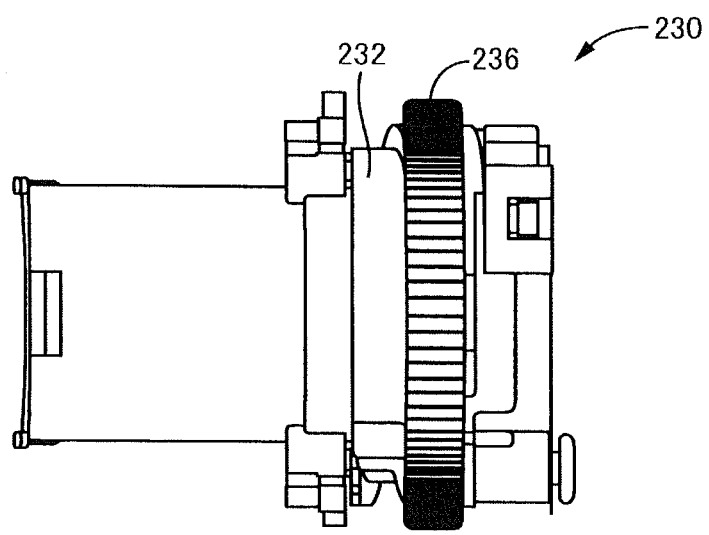
FIG. 7B is a side view illustrating the focus adjustment mechanism in a state that the LCD adjuster has been attached.

The motion conversion mechanism 238 is related to the LCD adjuster 236 and the LCD holder 232. The motion conversion mechanism 238 converts the revolution motion of the LCD adjuster 236 into the linear motion of the LCD holder 232 and thereby moves the LCD 220 to a desired position in the optical axis direction. In the present embodiment, as illustrated in FIG. 7A, the motion conversion mechanism 238 includes: a cam groove 242 having a spiral shape formed in the outer peripheral surface of the LCD holder 232; and a drive pin (not illustrated) formed in the inner peripheral surface of the LCD adjuster 236 and extending in the radial direction. The drive pin is engaged with the cam groove 242 without backlash and then, in the engagement state, moved relatively along the cam groove 242. When the LCD adjuster 236 is revolved, the drive pin performs circular motion about the optical axis and then the circular motion is converted into the linear motion of the LCD holder 232 by virtue of the cooperation between the cam groove 242 and the support mechanism 234.

Nevertheless, the motion conversion mechanism 238 may perform necessary movement conversion by employing a mechanism other than the cam mechanism. For example, a screw mechanism (e.g., a female screw formed in the inner peripheral surface of the LCD adjuster 236; and a male screw formed in the outer peripheral surface of the LCD holder 232 which is screwed into the female screw) may be adopted.

As illustrated in FIG. 6, the display unit 12 further includes an ocular optical member 246. The ocular optical member 246 is configured as a one-dimensional array in which a plurality of lenses serving as a plurality of optical elements are arranged in series. These lenses share the same optical axis. The optical axis extends in straight line in parallel with the longitudinal direction of the housing 200 without a situation that the direction is bent by a component such as a mirror. The ocular optical member 246 is accommodated in a portion of the housing 200 belonging to the main body part 210.

That is, in the present embodiment, the drive circuit 222, the LCD 220, the focus adjustment mechanism 230, and the ocular optical member 246 aligned in one line are all accommodated in the main body part 210.

One (a "terminal lens", hereinafter) 248 located in the most downstream among the plurality of lenses in the ocular optical member 246 has a possibility that the user accidentally touches the terminal lens 248 unless a special measure is taken. If the user touches the terminal lens 248, the terminal lens 248 gets dirty and this could cause degradation of the display image.

In contrast, in the present embodiment, the ocular optical member 246 includes a protection transparent body (e.g., a transparent disk fabricated from synthetic resin) 250 arranged in the downstream of the terminal lens 248. The protection transparent body 250 avoids direct access to the terminal lens 248 by the user and thereby protects the terminal lens 248 such that degradation is not caused in the image quality. The user may clean or change the protection transparent body 250 depending on the necessity. This permits prevention of a loss of image light and hence degradation in the image quality.

The emission port part 214 includes a half mirror (an example of a deflection member deflecting image light toward the observing eye) 260 serving as a partial reflection and partial transmission optical element configured to bend the image light emitted from the ocular optical member 246 so as to guide the image light toward the observing eye. The half mirror 260 is mounted on the tip part of the emission port part 214 in a manner permitting rotation about the axis of the up and down directions. The half mirror 260 is allowed to be rotated between an accommodation position and a development position (a using position). The half mirror 260 is mounted on the emission port part 214 in a rotatable manner in an orientation of protruding from the emission port part 214 toward the observing eye.

The image light emitted from the ocular optical member 246 is reflected by the half mirror 260, then passes through the pupil of the observing eye, and then enters the retina (not illustrated). By virtue of this, the observer is allowed to observe a two-dimensional image as a virtual image. In addition to the image light reflected by the half mirror 260, light (external light) from the actual external world transmitted through the half mirror 260 enters the observing eye. As a result, the observer is allowed to observe the actual external world in parallel to the observation of the image displayed with the image light.

Figure 8:
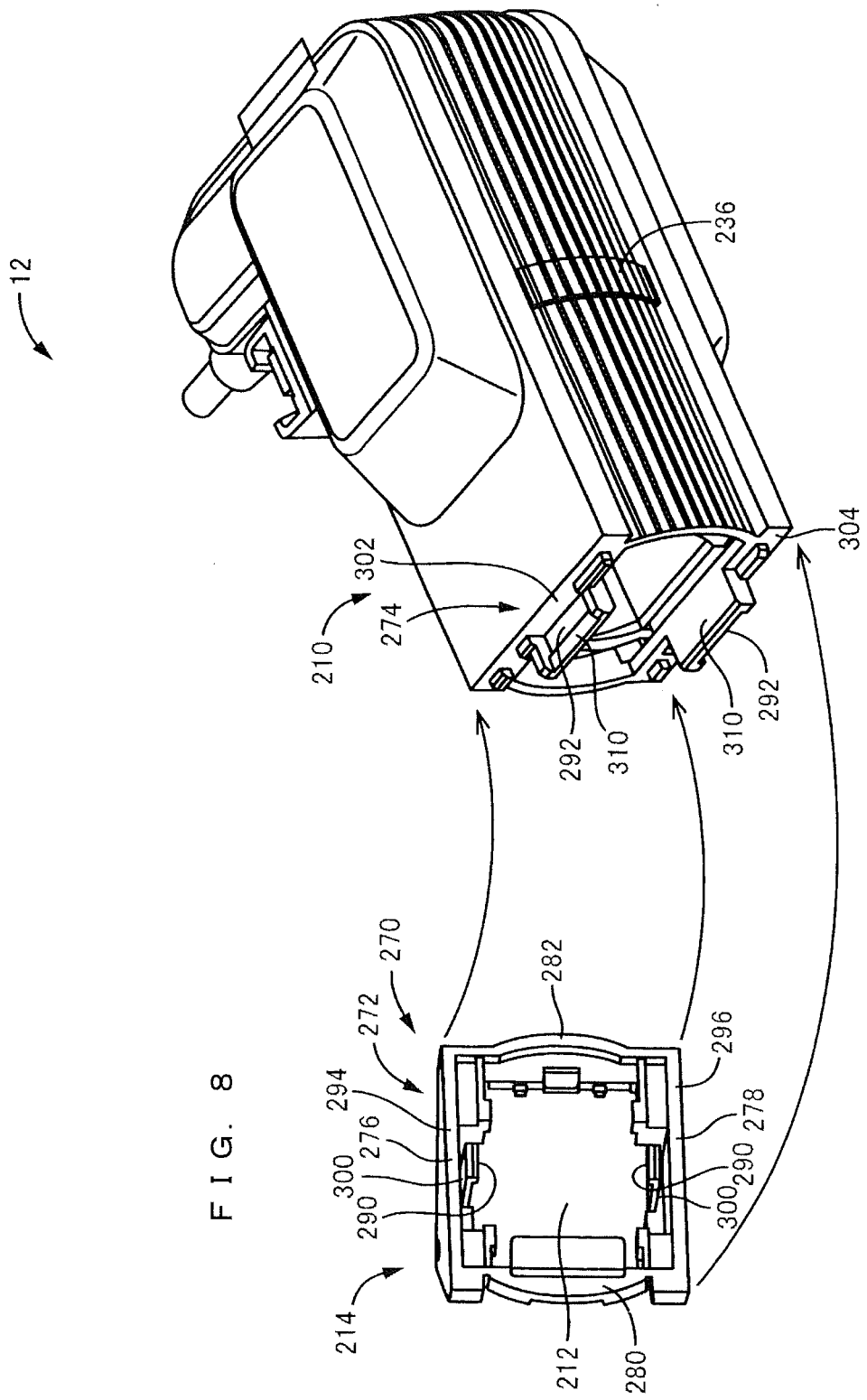
FIG. 8 is an exploded perspective view illustrating the display unit illustrated in FIG. 1.

As illustrated in FIG. 8, the display unit 12 is divided into a component referred to as the main body part 210 and a component referred to as the emission port part 214. These components are connected in a mutually separable manner. When the emission port part 214 is separated from the main body part 210, the user is allowed to access and clean the protection transparent body 250.

Figure 9A:
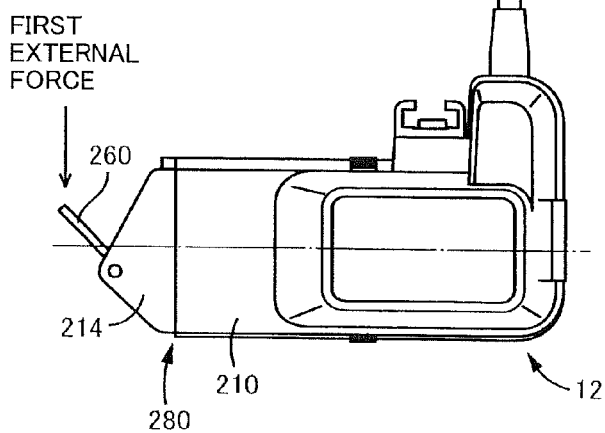
FIG. 9A is a plan view illustrating the display unit illustrated in FIG. 8 in an assembled state.
Figure 9B:
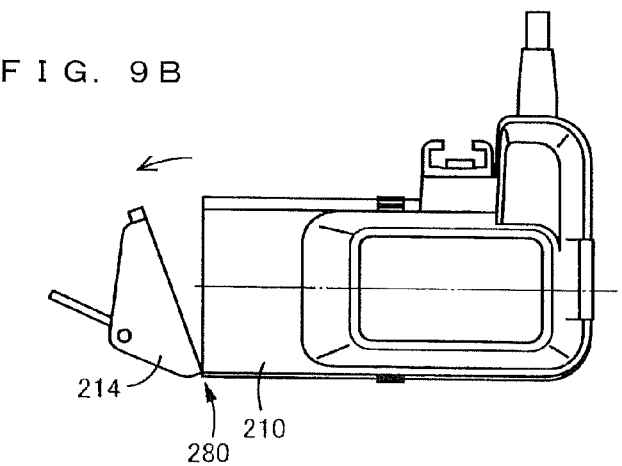
FIG. 9B is a plan view illustrating the display unit in a state that the emission port part has been separated from the main body part as a result of rotation about the axis of up and down directions.

The display unit 12 further includes a connection mechanism detachably connecting the main body part 210 and the emission port part 214 to each other. As illustrated in FIGS. 9A and 9B, the connection mechanism 270 is configured such that in the head mounting state, when the emission port part 214 comes into contact with the protection member so that the first external force acts on the emission port part 214, the first external force allows the emission port part 214 to be detached from the main body part 210. For example, the emission port part 214 may be the tip part of the half mirror 260. Further, for example, the protection member may be the lens-shaped transparent bodies 22 and 22 in front of the observing eye.

Thus, according to the present embodiment, during the use of the HMD 10, even if the emission port part 214 comes into contact with the protection member, a situation is avoided that the emission port part 214 continues contacting the protection member. This improves safety of the HMD 10 for the user during the use.

Specifically, the connection mechanism 270 is configured such that a moment that is generated in the emission port part 214 when the first external force acts from the protection member onto the emission port part 214 and that causes rotation of the emission port part 214 about a fulcrum of the contact point with the main body part 210 allows the emission port part 214 to be detached from the main body part 210. The connection mechanism 270 is arranged between a first connection end 272 connected to the main body part 210 in the emission port part 214 in the state of connecting with the main body part 210 and a second connection end 274 connected to the emission port part 214 in the main body part 210 in the state of connecting with the emission port part 214.

As illustrated in FIG. 8, the first connection end 272 of the emission port part 214 and the second connection end 274 of the main body part 210 both have an approximate cross section of horizontally elongated rectangular shape. Thus, the end face of the first connection end 272 and the end face of the second connection end 274 both include: upper and lower horizontal edges 276 and 278 extending approximately in parallel to each other and in the frontward and rearward directions in the head mounting state; and front side and rear side vertical edges 280 and 282 extending approximately in parallel to each other and in the up and down directions in the head mounting state. As illustrated in FIGS. 9A and 9B, when the first external force acts from the observer's face onto the emission port part 214, the emission port part 214 is rotated relative to the main body part 210 about the front side vertical edge 280 (the contact point between the emission port part 214 and the main body part 210) distant from the observer among the pair of vertical edges 280 and 282.

Figure 9C:
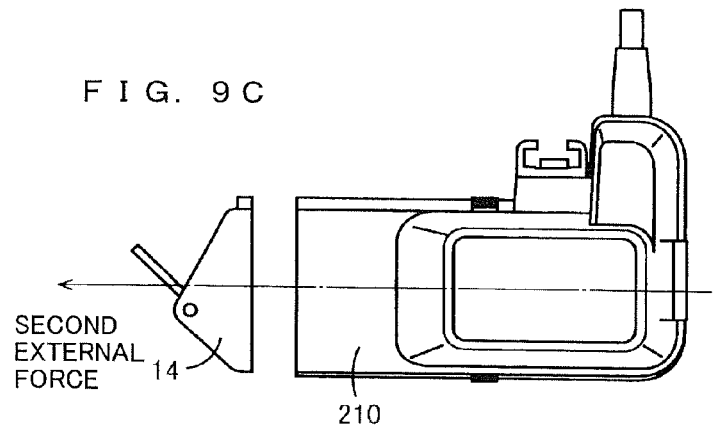
FIG. 9C is a plan view illustrating the display unit in a state that the emission port part has been separated from the main body part as a result of translational motion.

As illustrated in FIG. 9C, the connection mechanism 270 is configured such that when the second external force in a direction of pulling the emission port part 214 from the main body part 210 toward the longitudinal direction acts on the emission port part 214, the second external force allows the emission port part 214 to be detached from the main body part 210.

Thus, according to the present embodiment, when maintenance need be performed on the display unit 12 like cleaning of the protection transparent body 250, the user is allowed to easily detach the emission port part 214 from the main body part 210. This improves easiness of maintenance of the HMD 10.

Further, in the present embodiment, the connection mechanism 270 is configured such that detachment of the emission port part 214 by the first external force is achieved more easily than detachment of the emission port part 214 by the second external force. Specifically, for example, the connection mechanism 270 is configured such that the first external force necessary for detachment by the rotation of the emission port part 214 is smaller than the second external force necessary for detachment by the translational motion of the emission port part 214. Thus, according to the present embodiment, safety design that even if the emission port part 214 comes into contact with the protection member, the contact does not continue is realized preferentially than design that improves the maintenance property of the display unit 12.

As illustrated in FIG. 8, the connection mechanism 270 includes a protrusion 290 and a recess 292 allowed to be engaged with and detached from each other. One of the protrusion 290 and the recess 292 is provided in the main body part 210 and the other is provided in the emission port part 214.

Specifically, in the present embodiment, the protrusion 290 is formed in the tip part of hooks 300 and 300 formed integrally in a cantilever manner in each of the upper plate 294 and the lower plate 296 opposite to each other in the up and down directions in the first connection end 272 of the emission port part 214. Each hook 300 has a thin plate shape in a horizontally elongated cross section and extends outward from the emission port part 214 toward the main body part 210 approximately in the left and right directions in the head mounting state. The upper and lower protrusions 290 and 290 protrude in mutually opposite directions in side view at mutually the same position in plan view.

Each hook 300 is fabricated from synthetic resin and allowed to be elastically deformed in a direction perpendicular to the surface thereof. Thus, each protrusion 290 is allowed to perform elastic displacement approximately in the up and down directions relatively to the emission port part 214. That is, each hook 300 serves as a cantilever elastic beam.

In correspondence to this, the recess 292 is formed in receiving parts 310 and 310 formed integrally in a cantilever manner respectively in the upper plate 302 and the lower plate 304 opposite to each other in the up and down directions in the second connection end 274 of the main body part 210. The upper and lower recesses 292 are opened in mutually opposite directions in side view at mutually the same position in plan view. Similarly to the hook 300, the receiving part 310 extends outward from the main body part 210 toward the emission port part 214 approximately in the left and right directions in the head mounting state.

Similarly to the hook 300, the receiving part 310 extends outward from the main body part 210 in a cantilever manner. However, in contrast to the hook 300, the receiving part 310 does not perform substantial elastic deformation owing to the material-mechanical structure of the receiving part 310. That is, the receiving part 310 acts as a static member, whereas the hook 300 acts as a movable member.

Figure 10A:
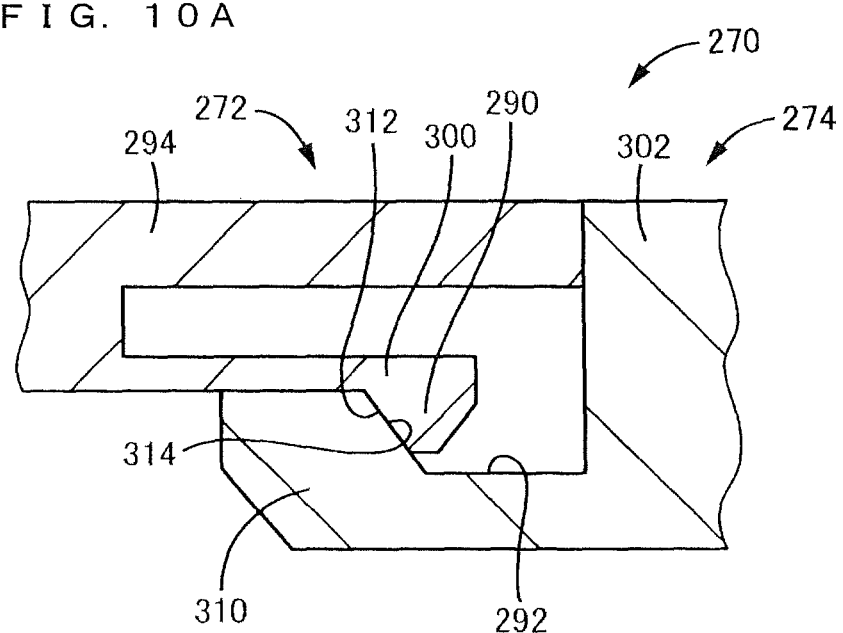
FIG. 10A is an enlarged partial sectional side view illustrating the connection mechanism illustrated in FIG. 8 in a state that a protrusion engages with a recess.
Figure 10B:
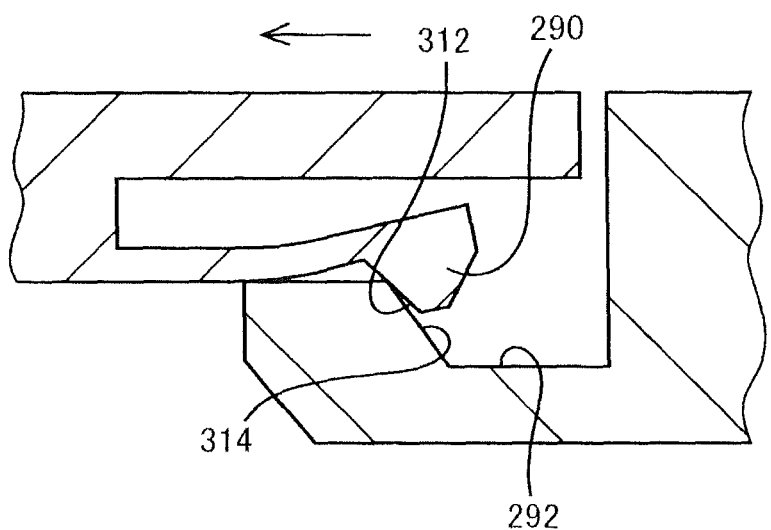
FIG. 10B is an enlarged partial sectional side view illustrating the connection mechanism in a state that the protrusion is climbing over an inclined side wall surface of the recess.

In FIG. 10A, the upper protrusion 290 formed in the first connection end 272 of the emission port part 214 engages with the inside of the upper recess 292 formed in the second connection end 274 of the main body part 210. In the engagement state, the protrusion 290 and the recess 292 are in contact with each other at the inclined surfaces 312 and 314 formed respectively. In the engagement state, when the first external force or the second external force acts on the emission port part 214 and finally on the protrusion 290, as illustrated in FIG. 10B, the protrusion 290 climbs over the recess 292 owing to the elastic displacement of the protrusion 290 in the opposing direction (the up and down directions in the example illustrated in FIG. 10) that the protrusion 290 and the recess 292 oppose to each other, so that the protrusion 290 is detached from the recess 292.

As described above, in the present embodiment, an inclined surface 312 inclined in the detachable direction of the protrusion 290 is formed in a portion of the outer wall surface of the protrusion 290 that comes into contact with the recess 292 when the protrusion 290 climbs over the recess 292. In contrast, an inclined surface 314 inclined in the detachable direction of the protrusion 290 is formed in a portion of the inner wall surface of the recess 292 that comes into contact with the protrusion 290 when the protrusion 290 climbs over the recess 292. Each of the inclined surfaces 312 and 314 has an orientation helping the protrusion 290 to climb over the recess 292. As a result, in comparison with a case that a vertical plane is adopted instead of the inclined surface in the portion where the protrusion 290 and the recess 292 coming into contact with each other in the engagement state, the force necessary for the separation of the emission port part 214 from the main body part 210 is reduced. This avoids a situation that when the emission port part 214 is to be separated from the main body part 210, the separation is not achieved or is difficult to be achieved.

As illustrated in FIG. 8, in the present embodiment, the upper and the lower protrusions 290 are both arranged symmetrically at an approximately center position in the frontward and rearward directions relative to the observer (the left and right directions in FIG. 8) in the head mounting state of the HMD 10 in the corresponding upper plate 294 or lower plate 296 of the emission port part 214.

By virtue of the symmetric arrangement, whenever the emission port part 214 is rotated about the vertical edge 280 or 282 relative to the main body part 210, the magnitude of the force necessary for detaching the protrusion 290 from the recess 292 is identical. That is, if the protrusion 290 is arranged such as to approach one of the vertical edges 280 and 282, detachment of the protrusion 290 by the rotation about the vertical edge 280 or 282 close to the protrusion 290 is easily achieved because the principle of leverage is allowed to be used. Nevertheless, detachment of the protrusion 290 by the rotation about the vertical edge 280 or 282 distant from the protrusion 290 is difficult because the principle of leverage is not allowed to be used. As such, the force necessary for detaching the emission port part 214 from the main body part 210 depends on the orientation of rotation of the emission port part 214. In contrast, according to the present embodiment, this situation is avoided that the force necessary for detaching the emission port part 214 from the main body part 210 depends on the orientation of rotation of the emission port part 214.

Figure 12A:
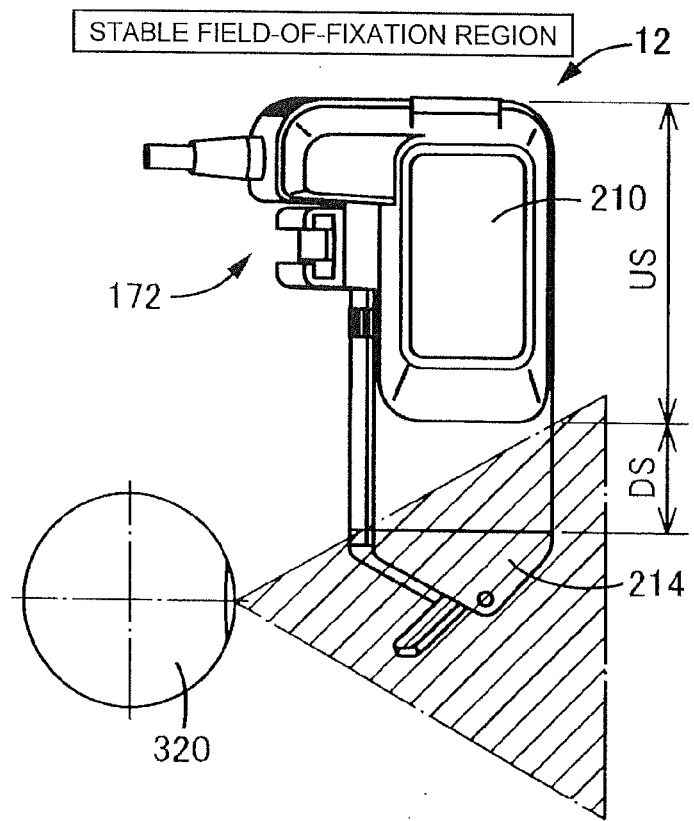
FIG. 12A is a plan view illustrating a situation that the emission port part in the display unit illustrated in FIG. 1 is located inside a stable field-of-fixation region for the observing eye.
Figure 12B:
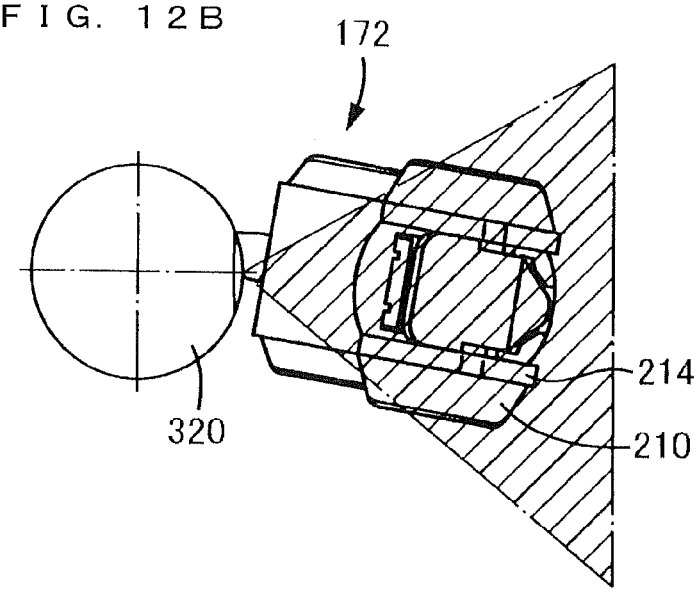
FIG. 12B is a side view illustrating a situation that the emission port part in the display unit illustrated in FIG. 1 is located inside the stable field-of-fixation region for the observing eye.

In FIG. 12A, the dividing position where the display unit 12 is divided into the emission port part 214 and the main body part 210 is illustrated in plan view in the relation with the position of the observing eye 320. As illustrated in FIG. 8, when the emission port part 214 is separated from the main body part 210, the second connection end 274 of the main body part 210 is exposed. A possibility arises that the exposed second connection end 274 comes into contact with the protection member (the lens-shaped transparent body 22 in front of the observing eye in the present embodiment).

As illustrated in FIG. 12A, in the present embodiment, the dividing position is determined such as not to be located in straight front of the observing eye 320 in the head mounting state of the HMD 10. As a result, when the emission port part 214 is separated from the main body part 210, the second connection end 274 of the main body part 210 is exposed. At this time, a possibility is reduced that the exposed second connection end 274 comes into contact with the protection member (especially, the observing eye 320). This situation also improves safety of the HMD 10 for the user during the use.

Those that could be arranged in forward view of the observing eye 320 in the head mounting state among the plurality of constituting components of the HMD 10 are the display unit 12 and the attachment 14 (including the position adjustment mechanism 172).

On the other hand, in the design of the HMD 10 of see-through type, it is preferable that a visual feeling of oppression against the observer caused by the physical presence of the HMD 10 in the head mounting state of the HMD 10 is reduced as much as possible in a state that an occupancy space necessary for realizing the image display function (including ensuring of the image display area, realization of a target resolution, and the focus adjustment function) and the position adjustment function (the function of the position adjustment mechanism 172) is ensured to an extent satisfying the user's desire.

In light of such findings, in the present embodiment, setting is performed for the shape and the size of each of the main body part 210 and the emission port part 214 of the display unit 12 and for the relative arrangement of each of the main body part 210, the emission port part 214, and the position adjustment mechanism 172 relative to the observing eye 320.

First, the design of the HMD 10 for ensuring the image display function is described below. In the present embodiment, in order to ensure the target shape of the image display area (being a horizontally elongated rectangular shape; and a target aspect ratio) and the target size (a size in accordance with the view angle of the HMD 10), the display unit 12 is designed such that the emission port part 214 has a horizontally elongated cross section extending in the frontward and rearward directions relative to the observer in the head mounting state.

As described above, the shape of the horizontally elongated cross section of the emission port part 214 is set such as to reflect the shape of the image display area. The horizontally elongated cross section of the emission port part 214 is a cross section obtained by virtually cutting the emission port part 214 at a vertical plane extending in the frontward and rearward directions in the head mounting state. In order that this cross section should be horizontally elongated and extend in the frontward and rearward directions, for example, the cross section may be a horizontally elongated rectangle or alternatively a horizontally elongated round shape (including an ellipse).

According to the present embodiment, the emission port part 214 is arranged relative to the observing eye such as to have a horizontally elongated cross section in side view. Thus, the area of shielding of the observer's front viewing field caused by the emission port part 214 is reduced in comparison with a case that the aspect ratio of the cross section of the emission port part 214 has a value representing a cross sectional shape closer to a square cross section than a horizontally elongated cross section.

Further, according to the present embodiment, the vertical dimension of the horizontally elongated cross section of the emission port part 214 (the dimension in the up and down directions in the head mounting state, in the present embodiment) is set to be smaller than the vertical dimension of the horizontally elongated cross section of the main body part 210 (the dimension in the up and down directions in the head mounting state, in the present embodiment). Thus, according to the present embodiment, in comparison with a case that the vertical dimension of the horizontally elongated cross section of the emission port part 214 is the same as or greater than the vertical dimension of the horizontally elongated cross section of the main body part 210, the area of shielding of the observer's front viewing field caused by the emission port part 214 is reduced.

Next, the design of the HMD 10 for ensuring the resolution of the display image is described below. In the present embodiment, in order to ensure the resolution of the display image, design is performed such that the size of the LCD 220 (the size of the display surface) is larger than the size of the cross section of the emission port part 214. Although technical advancement and mass-production effects in the future may realize a still smaller LCD 220 having a cheap price and equivalent performance, the LCD 220 has a comparatively large size at present. In association with the design of the size of such the LCD 220, design is performed such that the size of the cross section of the main body part 210 accommodating the LCD 220 is larger than the size of the cross section of the emission port part 214.

According to the present embodiment, the main body part 210 is arranged relative to the observing eye such as to have a horizontally elongated cross section in side view. Thus, the area of shielding of the observer's front viewing field caused by the main body part 210 is reduced in comparison with a case that the aspect ratio of the cross section of the main body part 210 has a value representing a cross sectional shape closer to a square cross section than a horizontally elongated cross section.

Next, the design of the HMD 10 for ensuring the position adjustment function is described below. In the present embodiment, as described above, a front-and-rear position adjustment mechanism is not present that adjusts the display unit 12 relative to the observing eye 320 in the frontward and rearward directions. Thus, the function of the position adjustment mechanism 172 is simplified and hence the size is reduced in comparison with a position adjustment mechanism of a type further including a front-and-rear position adjustment mechanism. It is difficult that the size of the position adjustment mechanism 172 is reduced to a size similar to that of the LCD 220 in the up and down directions. Thus, it is unavoidable that the position adjustment mechanism 172 has a larger size than the main body part 210 of the display unit 12.

That is, in the present embodiment, the sizes in the up and down directions are compared with each other for the main body part 210 and the emission port part 214 of the display unit 12 as well as the position adjustment mechanism 172 in the head mounting state of the HMD 10. The sizes in the up and down directions increase in the order of the emission port part 214, the main body part 210, and the position adjustment mechanism 172.

Meanwhile, when an obstacle shielding the light at least partly is present in front of the observing eye 320, the person receives a feeling of discomfort such as a feeling of oppression and a feeling of blockade from the obstacle. However, it is not true that the degree of such discomfort is the same regardless of the relative position of the obstacle relative to the observing eye 320. That is, the degree of discomfort varies depending on the positions of the obstacle. Some positions cause a strong feeling of discomfort and some other positions do not cause such a feeling of discomfort. It is preferable that the relative positions of the individual parts of the HMD 10 relative to the observing eye 320 is determined with taking into consideration such human viewing field characteristics (perception characteristics).

Figure 11:
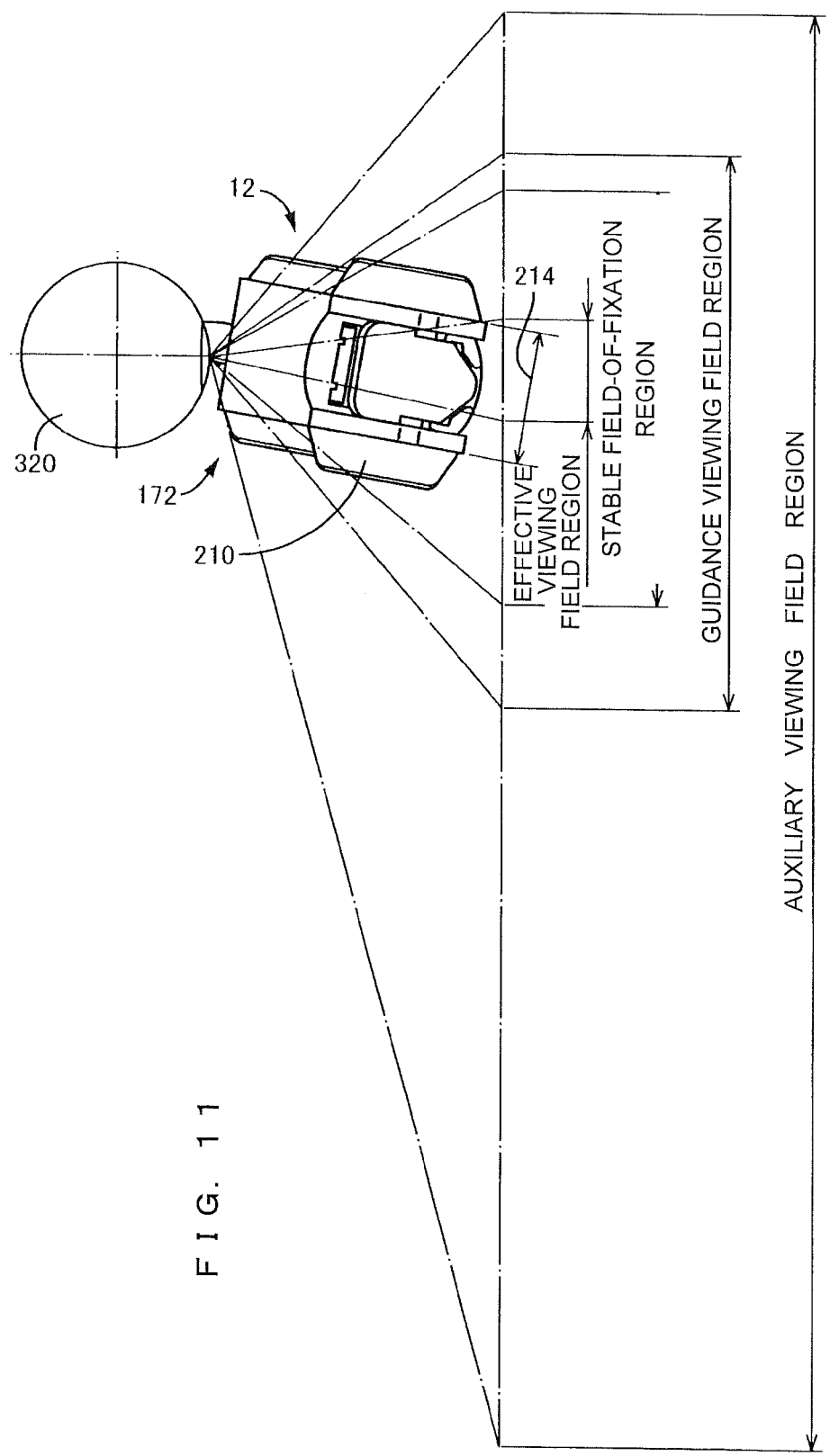
FIG. 11 is a side view illustrating the display unit illustrated in FIG. 1 in a state of being used, together with the eyeball of the observing eye and a plurality of viewing field regions for the observing eye.

In FIG. 11, four viewing field regions of the observing eye 320 which are known well are illustrated in side view. These viewing field regions include: an effective viewing field region located in the center; a stable field-of-fixation region located in the outside thereof; a guidance viewing field region located in the still outside; and an auxiliary viewing field region furthermore located outside. According to a particular definition opened to the public, the classification of the viewing field regions is as follows.

1. Effective Viewing Field Region

A region where an object is allowed to be caught by eye movement alone and a target object (visual information) is allowed to be recognized in the noise, which is a region within approximately 15 degrees in the left and right directions, approximately 8 degrees in the upward direction, and approximately 12 degrees in the downward direction relative to the sight line of the observing eye 320 (referred to as the "sight line at the time of forward-looking observation", hereinafter) when the person is looking forward straightly.

2. Stable Field-of-Fixation Region

A region where a target is allowed to be seen with attention by using the movement of the head of the observer in addition to the eye movement without difficulty, which is a region within approximately 30 to 45 degrees in the left and right directions, approximately 20 to 30 degrees in the upward direction, and approximately 25 to 40 degrees in the downward direction relative to the sight line at the time of forward-looking observation of the observing eye 320.

3. Guidance Viewing Field Region

A region where a presented object is not allowed to be identified and the presence thereof alone is allowed to be determined but the feeling of human space coordinates is affected, which is a region within approximately 30 to 100 degrees in the left and right directions and approximately 20 to 85 degrees in the upward and downward directions relative to the sight line at the time of forward-looking observation of the observing eye 320.

4. Auxiliary Viewing Field Region

A region where perception to a presented object falls to a remarkably low level and the action of attention is induced only by a strong stimulus or the like, which is a region within approximately 100 to 200 degrees in the left and right directions and approximately 85 to 135 degrees in the upward and downward directions relative to the sight line at the time of forward-looking observation of the observing eye 320.

In the present embodiment, with taking into consideration the above-mentioned human vision characteristics, the relative positions of the individual parts of the HMD 10 relative to the observing eye 320 have been determined.

In addition, as illustrated in FIGS. 6 and 12, the main body part 210 includes an upstream part US and a downstream part DS relative to the direction of movement of the image light. Then, at the end of the downstream part DS, the main body part 210 is detachably connected to the emission port part 214. Further, in the main body part 210, the upstream part US has a larger size in the up and down directions than the downstream part DS. This is because the upstream part US accommodates the LCD 220 which is an optical element larger than the other optical elements.

1. Position of Emission Port Part 214 in Display Unit 12

As illustrated in side view in FIG. 11, the emission port part 214 need play the essential role of projecting the image light onto the observing eye 320 and hence need be located within the effective viewing field region. Further, because of the size of the emission port part 214 in the up and down directions, not the entirety of the emission port part 214 is allowed to be arranged within the effective viewing field region. Thus, as illustrated in plan view in FIG. 12A and side view in FIG. 12B, a part of the emission port part 214 and the downstream part DS reaches even the stable field-of-fixation region. However, these parts are arranged such as not to reach the outside of the stable field-of-fixation region, that is, the guidance viewing field region. This condition holds over the entirety of the movable region of the display unit 12 achieved by the position adjustment mechanism 172.

Thus, according to the present embodiment, in comparison with a case that even a part of the emission port part 214 falls within the guidance viewing field region, a feeling of discomfort is reduced that is received from the emission port part 214 by the observer during the use of the HMD 10.

2. Position of Main Body Part 210 in Display Unit 12

As illustrated in side view in FIG. 11, the main body part 210 protrudes respectively in the up and down directions relative to the emission port part 214. Accurately, in the present embodiment, as illustrated in FIG. 6, the upstream part US of the main body part 210 protrudes respectively in the up and down directions relative to the downstream part DS and the emission port part 214 (having substantially the same size in the up and down directions). This is because the main body part 210 accommodates the LCD 220 and the focus adjustment mechanism 230 which are larger than the size of the image display area. As illustrated in plan view in FIG. 12A, side view in FIG. 12B, plan view in FIG. 12C, and side view in FIG. 12D, a part of the upstream part US and the downstream part DS of the main body part 210 is completely not present within the stable field-of-fixation region and is arranged such as to bridge the guidance viewing field region and the auxiliary viewing field region. This condition holds over the entirety of the movable region of the display unit 12 achieved by the position adjustment mechanism 172.

Thus, according to the present embodiment, in comparison with a case that at least a part of the upstream part US of the main body part 210 is present within the stable field-of-fixation region, a feeling of discomfort is reduced that is received from the main body part 210 by the observer during the use of the HMD 10.

3. Position of Position Adjustment Mechanism 172

As illustrated in perspective view in FIG. 1 and side view in FIG. 11, the position adjustment mechanism 172 is located in a rear part relative to the main body part 210 in the head mounting state of the HMD 10. As illustrated in FIG. 1, the position adjustment mechanism 172 is arranged in the rear face of the display unit 12 in side view, and has a portion protruding upward from the display unit 12. Thus, although not illustrated in FIGS. 11 and 12A to 12D, the position adjustment mechanism 172 has a larger size than the main body part 210 of the display unit 12 in the up and down directions.

Figure 12C:
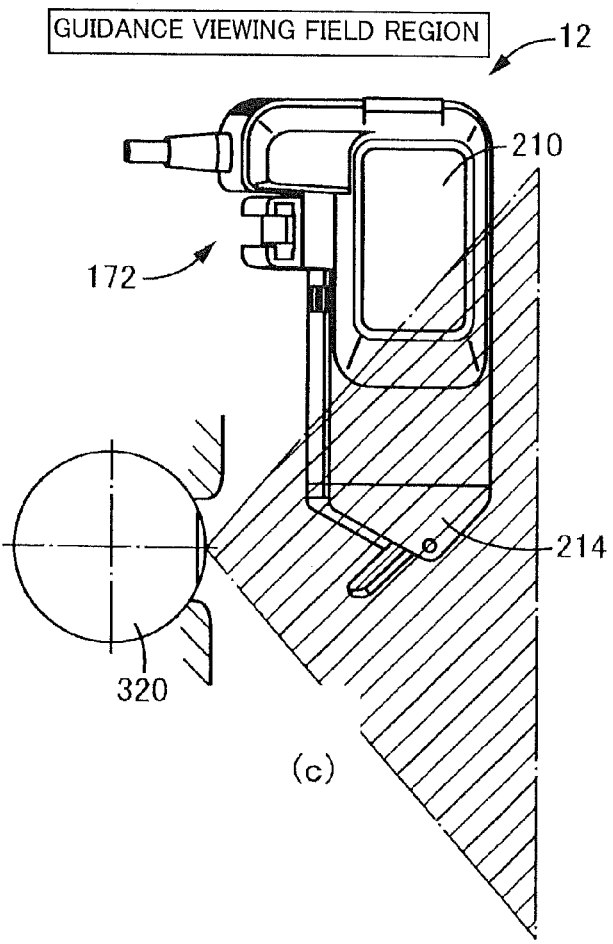
FIG. 12C is a plan view illustrating a situation that the main body part in the display unit is located outside the stable field-of-fixation region for the observing eye.
Figure 12D:
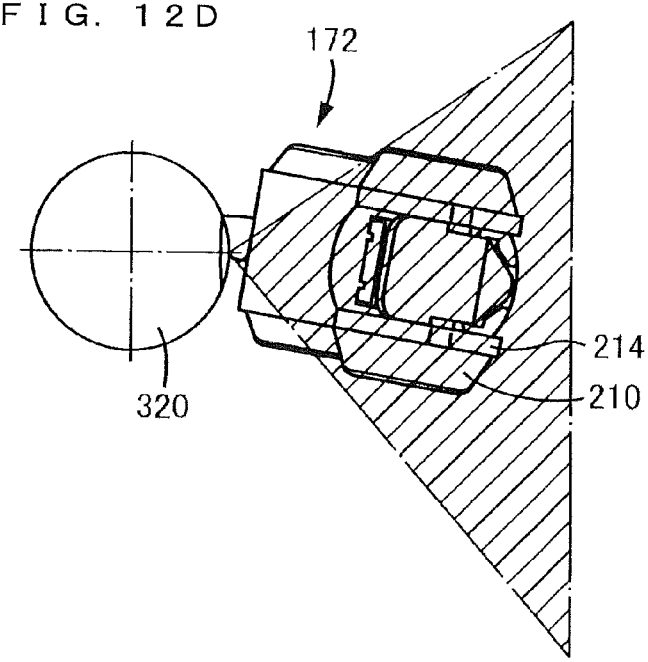
FIG. 12D is a side view illustrating a situation that the main body part in the display unit is located outside the stable field-of-fixation region for the observing eye.

Then, as illustrated in FIGS. 11, 12C, and 12D, the position adjustment mechanism 172, on the whole, is present in the auxiliary viewing field region, and is completely not present in the guidance viewing field region in the inside thereof. This condition holds over the entirety of the movable region of the moving part of the position adjustment mechanisms 172.

Thus, according to the present embodiment, in comparison with a case that even a part of the position adjustment mechanism 172 falls within the guidance viewing field region, a feeling of discomfort is reduced that is received from the position adjustment mechanism 172 by the observer during the use of the HMD 10.

Next, the setting of the eye relief of the HMD 10 is described below with reference to FIG. 13.

As described above, in the present embodiment, for the purpose of switching the observation mode of the HMD 10 between the left-eye observation mode and the right-eye observation mode, the same display unit 12 is attached to the left-eye frame side member 40L or the right-eye frame side member 40R. In the present embodiment, a member performing the movement of changing the distance between the display unit 12 and the frame 20 in the frontward and rearward directions (a factor affecting the length of eye relief described later) is not arranged between the display unit 12 and frame 20. This avoids a situation that the distance between the display unit 12 and the frame 20 in the frontward and rearward directions varies between the left-eye observation mode and the right-eye observation mode depending on the changing operation by the user.

Further, as described above, in the present embodiment, the observer is not allowed to adjust the position in the frontward and rearward directions relative to the observer among the relative positions of the display unit 12 relative to the frame 20. This situation is different from those for the position in the left and right directions and the position in the up and down directions. This is premised on the fact that as for the position in the frontward and rearward directions, not very large individual difference (e.g., difference in the preference) is present between observers in comparison with the position in the left and right directions and the position in the up and down directions and hence the necessity of adjustment for each observer is not very high. Further, this ensures that in the structure of the HMD 10, the relative position of the display unit 12 in the frontward and rearward directions relative to the frame 20 is common between the left-eye observation mode and the right-eye observation mode.

Further, in the present embodiment, the frame 20 is of eye glasses type. Thus, when the observer merely mounts the frame 20 onto the own head in a manner that the pair of pads 36 and 36 of the frame 20 come into contact with the both sides of the observer's nose, the relative position of the frame 20 relative to the observing eye 320 is determined uniquely. That is, the relative position of the frame 20 relative to the observing eye 320 is constant at each time of use of the HMD 10 and maintained at constant during each time of use.

Figure 13:
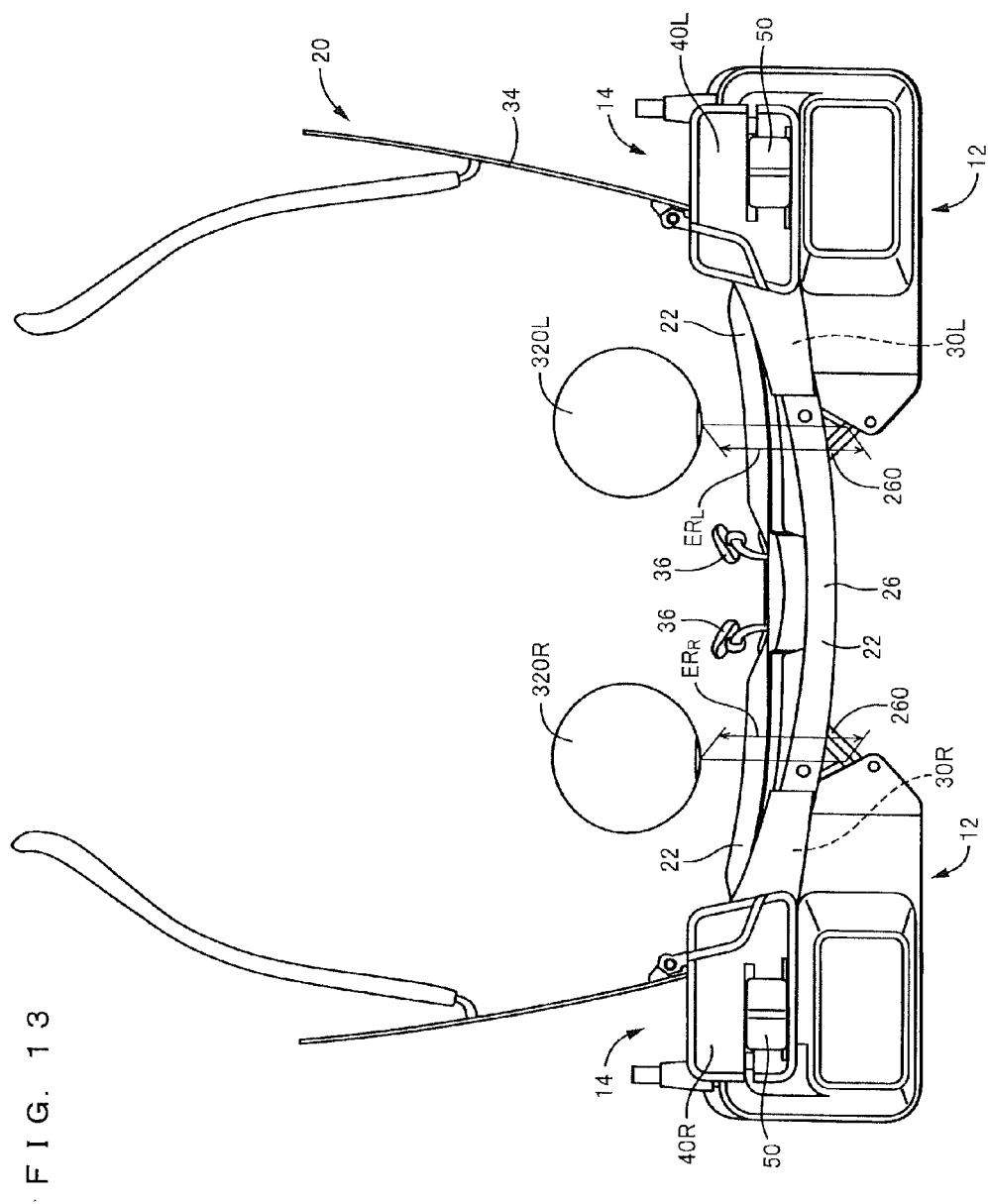
FIG. 13 is a plan view illustrating a situation that the eye relief of the HMD illustrated in FIG. 1 is identical in the left-eye observation mode and in the right-eye observation mode.

As illustrated in FIG. 13, the eye relief of the HMD 10, that is, the distance between the final point of the optical path of the image light in the display unit 12 and the exit pupil of the HMD 10, is ensured to be in common between the left-eye observation mode and the right-eye observation mode. Here, the final point of the optical path of the image light is a point where the image light enters the half mirror 260 as well as a point where the image light exits the half mirror 260 toward the observing eye 320. Further, the exit pupil of the HMD 10 is arranged near the pupil position within the observing eye 320. That is, the eye relief $ER_L$ for the left-eye observation mode and the eye relief ERR for the right-eye observation mode are ensured to always agree with each other.

Thus, according to the present embodiment, the left-right difference in the eye relief of the HMD 10, that is, a situation that the eye relief is different from each other between the left-eye observation mode and the right-eye observation mode, is avoided. Thus, a situation is avoided that the observer feels uneasiness caused by the left-right difference in the eye relief.

Next, with reference to FIG. 14, description is given for setting of the orientation of the display unit 12 relative to the sight line of the observing eye 320 in side view and setting of the position adjustment direction of the display unit 12 by the up-and-down position adjustment mechanism 170. As illustrated in FIG. 14, in the display unit 12, a unit reference line RL is set up that extends in the frontward and rearward directions thereof relative to the display unit 12. Further, the sight line of the observing eye 320 in a situation that the observer looks forward straightly is the above-mentioned sight line SL at the time of forward-looking observation.

In the conventional art, in general, the display unit 12 has been positioned relative to the observing eye 320 such that the unit reference line RL and the sight line SL at the time of forward-looking observation agree with each other or are parallel to each other in side view.

However, as a result of researches by the present inventor, a fact has been found that when the observer looks forward straightly, tension to an extent arises in the muscles of the observing eye 320 and hence when observation of the display image of the HMD 10 is continued in a state that the actual sight line is maintained at the sight line SL at the time of forward-looking observation, the observing eye 320 is easily fatigued.

Further, the present inventor has found a fact that the observer looks at the direction of a line inclined downward slightly relative to the sight line SL at the time of forward-looking observation as departing ahead from the observing eye 320, thereby the observing eye 320 is not easily fatigued even when the same sight line is maintained.

On the basis of these findings, in the present embodiment, the HMD 10 is designed such that the attachment 14 holds the display unit 12 in a manner that the unit reference line RL of the display unit 12 is inclined downward by an angle θ (e.g., approximately 10 degrees) relative to the sight line SL at the time of forward-looking observation in side view as departing ahead from the observing eye 320.

In order that the display unit 12 is arranged in an orientation of being inclined relative to the sight line SL at the time of forward-looking observation in side view as described above, as illustrated in FIGS. 4C to 4E, the shank 84 engaging with the display unit 12 in a manner permitting the sliding approximately in the up and down directions extends linearly in the longitudinal direction thereof but is bent rearward relative to the head 80 and the neck 82 aligned linearly with each other in the same intermediate member 50 in the head mounting state and in side view.

As a result, according to the present embodiment, the observer is allowed to observe the display image of the HMD 10 without very strong tension in the muscles of the observing eye 320. Thus, even when the observer continuously observes the display image of the HMD 10, the observing eye 320 is not remarkably fatigued.

Further, in the present embodiment, in addition to the above-mentioned setting of the unit reference line RL, design is performed such that when the up-and-down position adjustment direction is defined as the direction of a line inclined rearward by an angle Ψ as departing downward from the observing eye 320 relative to the vertical line VL passing the forward view of the observing eye 320 in side view, the up-and-down position adjustment mechanism 170 adjusts the position of the display unit 12 in the up-and-down position adjustment direction. The angle Ψ is the smaller one of two angles formed between the up-and-down position adjustment direction and the direction of the vertical line VL. The up-and-down position adjustment mechanism 170 performs parallel displacement of the display unit 12 in side view. As a result, according to the present embodiment, at any position of the display unit 12 in the up-and-down position adjustment direction, the angle formed between the actual sight line of the observing eye 320 and the unit reference line RL in side view is maintained at the angle θ. In the present embodiment, selection is performed such that the angle θ agrees with the angle Ψ. Instead, the selection may be performed such that the two angles are different from each other.

Further, in the present embodiment, as illustrated in FIG. 14, the display unit 12 is arranged such as to be close to the front face of the lens-shaped transparent body 22 located in front of the observing eye 320 in side view. Similarly to the display unit 12 in the head mounting state, the lens-shaped transparent body 22 has a forward inclined angle Ψ and, basically, the lens-shaped transparent body 22 and the display unit 12 have approximately the same forward inclined angle Ψ.

Thus, by virtue of the up-and-down position adjustment mechanism 170, the display unit 12 is displaced almost in parallel to a straight line approximating the lens-shaped transparent body 22 in side view. This ensures that as long as at a position where the display unit 12 is closest to the front face of the lens-shaped transparent body 22, a necessary interval is ensured between the two, the display unit 12 does not come into contact with, that is, does not interfere with, the front of the lens-shaped transparent body 22 over the entirety of the moving range of the display unit 12.

In addition, in the present embodiment, the up-and-down position adjustment mechanism 170 displaces the display unit 12 linearly in the up-and-down position adjustment direction. Instead, the up-and-down position adjustment mechanism 170 may be changed such as to displace the display unit 12 along a circular arc whose center agrees with the center of the observing eye 320. This situation holds also for the left-and-right position adjustment mechanism 120.

An embodiment of the present disclosure has been described above in detail with reference to the drawings. However, the description is merely illustrative. That is, the present disclosure may be implemented in other modes in which various modifications and improvements have been incorporated on the basis of the knowledge of the person skilled in the art.

What is claimed is:

1. A head mountable display comprising:
a display unit configured to project image light corresponding to an image signal onto an observing eye which is one of both eyes of an observer; and
an attachment configured to attach the display unit to a mounted member to be mounted on a head of the observer, wherein
the display unit includes:
a main body part accommodating an image light generator configured to generate the image light;
an emission part configured to deflect and emit the image light from the image light generator toward the observing eye by a deflection member; and
a connection mechanism detachably connecting the main body part and the emission part, wherein
the main body part and the emission part are arranged in a first direction, the first direction being a direction intersecting frontward and rearward directions relative to the observer in front of the observer's face when the display unit is mounted on the head of the observer through the attachment, wherein
the attachment is configured to hold the display unit to provide the emission part in front of the observing eye when the display unit is mounted on the head of the observer, and wherein
the connection mechanism is configured such that the emission part is detached from the main body part when the display unit is mounted on the head of the observer through the attachment and when the emission part comes into contact with a member located in front of the observing eye and thereby protecting the observing eye so that a first external force acts on the emission part.

2. The head mountable display according to claim 1, wherein the connection mechanism is configured such that the emission part is detached from the main body part by virtue of a moment about a contact point between the emission part and the main body part generated in the emission part when the first external force acts on the emission part.

3. The head mountable display according to claim 2, wherein the connection mechanism is provided between the emission part and the main body part when the emission part and the main body part are connected.

4. The head mountable display according to claim 1, wherein
the connection mechanism includes a protrusion and a recess engageable with each other,
one of the protrusion and the recess is provided in the main body part, and
the other of the protrusion and the recess is provided in the emission part.

5. The head mountable display according to claim 4, wherein the protrusion includes an inclined surface which narrows a width toward a top portion, the recess includes an inclined surface which narrows a width toward a bottom portion, and the inclined surfaces are in contact with each other when the protrusion and the recess engage with each other.

6. The head mountable display according to claim 1, wherein the connection mechanism is configured such that the emission part is detached from the main body part when a second external force in a direction of pulling the emission part from the main body part in the first direction acts on the emission part.

7. The head mountable display according to claim 6, wherein the connection mechanism is configured such that the first external force necessary for detaching the emission part is smaller than the second external force necessary for detaching the emission part.

8. The head mountable display according to claim 1, wherein when the display unit is mounted on the head of the observer, an end of the main body part allowed to be connected to the emission part is separated from the observing eye in the first direction.

9. The head mountable display according to claim 1, wherein the deflection member is a half mirror.

10. A head mountable display comprising:
an image light generator configured to generate image light;
an ocular optical member for receiving the image light from the image light generator;
a main body part accommodating the image light generator and the ocular optical member, the image light generator and the ocular optical member being aligned in a first direction;
a deflection member configured to deflect the image light from the ocular optical member in a second direction intersecting the first direction;
an emission part holding the deflection member and provided in one end of the main body part in the first direction; and
a connection mechanism provided between the main body part and the emission part and detachably connecting the main body part and the emission part.

11. The head mountable display according to claim 10, wherein the connection mechanism is provided in both of the emission part and the main body part.

12. The head mountable display according to claim 11, wherein
the connection mechanism includes a protrusion and a recess engageable with each other,
one of the protrusion and the recess is provided in the main body part, and
the other of the protrusion and the recess is provided in the emission part.

13. The head mountable display according to claim 12, wherein the protrusion includes an inclined surface which narrows a width toward a top portion, the recess includes an inclined surface which narrows a width toward a bottom portion, and the inclined surfaces are in contact with each other when the protrusion and the recess engage with each other.

14. The head mountable display according to claim 10, wherein the image light generator is provided in the other end of the main body part in the first direction.

15. The head mountable display according to claim 12, wherein two of the one of the protrusion and the recess are provided and are separated from each other in a third direction intersecting the first direction and the second direction, and
two of the other of the protrusion and the recess are provided and are separated from each other in the third direction.

16. The head mountable display according to claim 10, wherein the deflection member is a half mirror.

* * * * *